United States Patent
Dong et al.

(10) Patent No.: US 10,216,532 B2
(45) Date of Patent: Feb. 26, 2019

(54) MEMORY AND RESOURCE MANAGEMENT IN A VIRTUAL COMPUTING ENVIRONMENT

(71) Applicant: Intel Corporation, Santa Clara, CA (US)

(72) Inventors: Yao Zu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 14/778,520

(22) PCT Filed: Sep. 12, 2014

(86) PCT No.: PCT/CN2014/086360
§ 371 (c)(1),
(2) Date: Sep. 18, 2015

(87) PCT Pub. No.: WO2016/037344
PCT Pub. Date: Mar. 17, 2016

(65) Prior Publication Data
US 2016/0291998 A1    Oct. 6, 2016

(51) Int. Cl.
*G06F 9/46* (2006.01)
*G06F 9/455* (2018.01)
*G06F 3/06* (2006.01)

(52) U.S. Cl.
CPC ........ *G06F 9/45558* (2013.01); *G06F 3/0604* (2013.01); *G06F 3/0659* (2013.01);
(Continued)

(58) Field of Classification Search
None
See application file for complete search history.

(56) References Cited

U.S. PATENT DOCUMENTS

2006/0101181 A1* 5/2006 Post ............... G06F 9/45537
                                                    710/266
2007/0038837 A1* 2/2007 Ben-Zvi ........... G06F 12/109
                                                    711/207
(Continued)

FOREIGN PATENT DOCUMENTS

| CN | 102567080 A | 7/2012 |
| CN | 103019884 A | 4/2013 |
| CN | 104035822 A | 9/2014 |

OTHER PUBLICATIONS

International Search Report and Written Opinion dated Jun. 24, 2015 for International Application No. PCT/CN2014/086360, 11 pages.

*Primary Examiner* — Tammy E Lee
(74) *Attorney, Agent, or Firm* — Schwabe, Williamson & Wyatt, P.C.

(57) ABSTRACT

Systems and techniques for memory and resource management in a virtual computing environment are disclosed herein. For example, in some embodiments, an apparatus for memory management in a virtual computing environment may include: a storage device; memory page comparison logic, coupled to the storage device, to determine that a first memory page of instructions, stored in the storage device, for a guest machine in the virtual computing environment is identical to a second memory page of instructions, stored in the storage device, for a host machine in the virtual computing environment, wherein the guest machine is hosted by the host machine; and merge logic, coupled to the memory page comparison logic, to, in response to a determination that the first memory page is identical to the second memory page, map the first memory page to the second memory page. Other embodiments may be disclosed and/or claimed.

19 Claims, 12 Drawing Sheets

(52) U.S. Cl.
CPC .......... *G06F 3/0664* (2013.01); *G06F 3/0683* (2013.01); *G06F 2009/45583* (2013.01)

(56) References Cited

U.S. PATENT DOCUMENTS

| | | | |
|---|---|---|---|
| 2009/0007112 A1 | 1/2009 | Moriki et al. | |
| 2010/0023941 A1* | 1/2010 | Iwamatsu | G06F 12/109 718/1 |
| 2011/0213911 A1* | 9/2011 | Eidus | G06F 9/4856 711/6 |
| 2012/0254860 A1* | 10/2012 | Bozek | G06F 9/461 718/1 |
| 2013/0159639 A1* | 6/2013 | Corrie | G06F 12/00 711/154 |
| 2015/0012722 A1* | 1/2015 | Baskakov | G06F 12/1009 711/206 |

* cited by examiner

MEMORY AND RESOURCE MANAGEMENT IN A VIRTUAL COMPUTING ENVIRONMENT

CROSS REFERENCE TO RELATED APPLICATIONS

The present application is a national phase entry under 35 U.S.C. § 371 of International Application No. PCT/CN2014/086360, filed Sep. 12, 2014, entitled "MEMORY AND RESOURCE MANAGEMENT IN A VIRTUAL COMPUTING ENVIRONMENT", which designated, among the various States, the United States of America. The Specification of the PCT/CN2014/086360 Application is hereby fully incorporated by reference.

FIELD

Embodiments of the present disclosure generally relate to the field of computing devices, and more particularly, to hardware resource access.

BACKGROUND

Virtual computing environments, in which one or more guest machines execute on a host machine, are commonly used. To improve the memory access time of guest and host operations, guest machines and host machines often use a memory cache, and have typically shared at least some cache space.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the FIGS. of the accompanying drawings.

DETAILED DESCRIPTION

Figure 1:
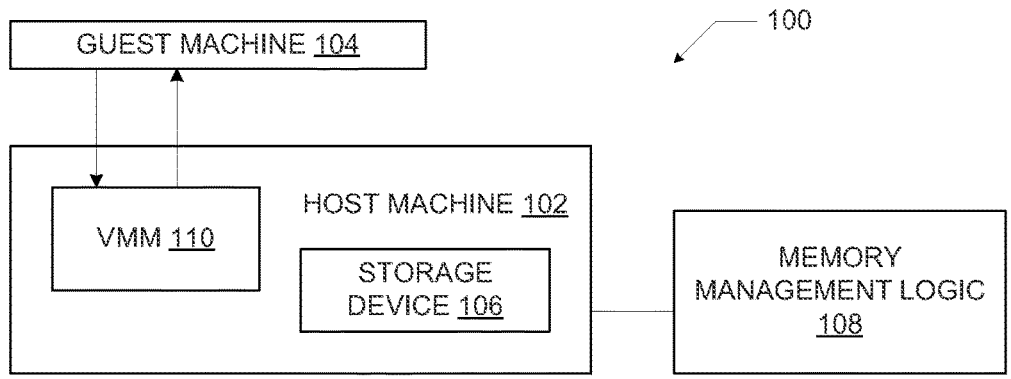
FIG. 1 is a block diagram of a virtual computing environment, in accordance with various embodiments.

Various systems and techniques for memory and resource management in a virtual computing environment are disclosed herein. For example, in some embodiments, an apparatus for memory management in a virtual computing environment may include: a storage device; memory page comparison logic, coupled to the storage device, to determine that a first memory page of instructions, stored in the storage device, for a guest machine in the virtual computing environment is identical to a second memory page of instructions, stored in the storage device, for a host machine in the virtual computing environment, wherein the guest machine is hosted by the host machine; and merge logic, coupled to the memory page comparison logic, to, in response to a determination that the first memory page is identical to the second memory page, map the first memory page to the second memory page.

In some embodiments, an apparatus for resource allocation in a virtual computing environment may include: a storage device; memory page comparison logic to determine that at least a first memory page of instructions, stored in the storage device, for a guest machine in the virtual computing environment is identical to at least a second memory page of instructions, stored in the storage device, for a host machine in the virtual computing environment, wherein the guest machine is unassigned to a host or assigned to a host different from the host machine; and assignment logic, coupled to the memory page comparison logic, to, in response to a determination that the first memory page is identical to the second memory page, assign the guest machine for execution on the host machine.

In some embodiments, an apparatus for memory organization in a virtual computing environment may include: a storage device; instruction comparison logic, coupled to the storage device, to determine that a first set of operating system instructions, stored in the storage device, for a guest machine in the virtual computing environment is identical to a second set of operating system instructions, stored in the storage device, for a host machine in the virtual computing environment, wherein the guest machine is not assigned for execution on the host machine; and arrangement logic, coupled to the instruction comparison logic, to, in response to a determination that the first set of operating system instructions is identical to the second set of operating system instructions, arrange a set of operating system instructions, the set of operating system instructions selected from the group consisting of the first set of operating system instructions and the second set of operating system instructions, so that the set of operating system instructions is included in one or more memory pages in the storage device, begins at a page boundary of the one or more memory pages, and ends at a page boundary of the one or more memory pages.

Various ones of the embodiments disclosed herein may provide improved management of memory caches in a virtual computing environment. In conventional virtual computing environments, different guest machines (performing different functions) are often swapped in and out of system control during operation. The use of a memory cache for a guest machine is a conventional technique to improve the response time when a guest machine is newly "swapped in" (because accesses to caches are faster than accesses to main memory, as known). Previous work has been directed to having similar guest machines share a cache in order to improve the cache hit rate and minimize the necessary size of the cache.

However, it has not been previously recognized that cache pressure also occurs when the host machine and a guest machine are swapped in and out of system control (e.g., in response to host interrupts). In conventional virtual computing environments, the guest machine and the host machine each store its own copy of instructions in the cache, and thus "pollute" it for the other. While increasing the size of a cache may help alleviate cache pressure, increasing cache size may also require increasing the die size and may not be a feasible or complete approach.

Some of the embodiments disclosed herein match guest machines with host machines such that guest machines run on "similar" host machines (i.e., those with common operating system instructions), and therefore need to only have one copy of the common instructions in the cache. Sharing memory pages between guests and hosts may mitigate cache pollution due to handling of guest exit events. In particular, some embodiments of systems and techniques disclosed herein may merge memory pages shared between the guest machine and a host machine in physical memory so that both the guest machine and the host machine refer to the same physical memory page when accessing a shared page.

Additionally, since instructions are read on the page level, various ones of the embodiments disclosed herein arrange instructions, store instructions, and/or select host and guest machine pairings such that the host machine and the guest machine share as many common whole memory pages as possible. Various embodiments disclosed herein may improve cache locality (e.g., based on content-based sharing between guests and hosts) and thus improve performance. Some embodiments of systems and techniques disclosed herein may, when determining whether and how to assign a guest machine to a host machine (e.g., in a cloud computing environment), compare the commonality of memory pages between machines and potential guest machines to match the guest machine to the host machine when managing resources. Pairing guests and hosts with identical or similar operating system memory pages (e.g., memory pages of kernel instructions) so that the guests and hosts can share may improve performance.

Some embodiments of systems and techniques disclosed herein may analyze the instruction sets used by each of the host machine and the guest machine and may arrange the instruction sets (e.g., by linking) so that whole memory pages of guest machine instructions are identical to whole memory pages of host machine instructions (and therefore can be readily shared). For example, guest operating system instructions and host operating system instructions may be developed and/or linked to use identical instruction sets for certain functions, and the instructions may be compiled into identical binary code with the same distribution of this code across memory pages. As discussed below, this may be referred to as "matching page granularity."

Identifying common memory pages between hosting guests may be particularly beneficial when the common memory pages correspond to "hot code." As used herein, "hot code" may refer to frequently invoked instructions, and may include interrupt handling instructions (e.g., interrupt service routines) and page fault handling instructions. Other examples of hot code may include, but are not limited to, certain libraries (e.g., memory move instructions), power management instructions (e.g., to resume from a particular state, such as S3), inter-processor communication instructions, central processing unit (CPU) management instructions (e.g., for context switching, timer management, interrupt controller configuration, etc.).

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Any of the logic and computing devices disclosed herein may include or have access to storage devices to store any suitable data or instructions used to provide the described functionality. As used herein, a "storage device" may include one or more storage devices coupled to a common computing device or system of coupled computing devices. A storage device may include storage devices that are local to each other (e.g., included in a common housing or in communication with a common computing device via local buses or other communication pathways) and storage devices that are remote from each other (e.g., included in separate housings or in communication via long-distance communication pathways, such as Internet-based pathways).

FIG. 1 is a block diagram of a virtual computing environment 100, in accordance with various embodiments. The virtual computing environment 100 may include a guest machine 104 hosted by a host machine 102. In some embodiments, the host machine 102 may include a virtual machine manager (VMM) 110. The VMM 110 may serve as an intermediary between the guest machine 104 and hardware resources of the host machine 102, as is conventionally known. The VMM 110 may manage exits and resumes of the guest machine 104, as discussed in further detail below. Although only a single guest machine 104 is shown in FIG. 1, this is simply for ease of illustration, and a host machine 102 may host two or more guest machines configured as discussed herein with reference to the guest machine 104.

The virtual computing environment 100 may be based on any suitable virtualization architecture. For example, in some embodiments, the virtual computing environment may be a kernel-based virtual machine (KVM) environment. Architectures with higher virtualization overhead may especially benefit from the memory and resource management techniques disclosed herein. For example, embodiments in which a VMM 110 intercepts execution of the guest machine 104 may incur extra virtualization overhead (e.g., in the form of additional guest cache pollution). This overhead may be particularly significant when the execution of the guest machine 104 incurs frequent exits of the guest machine 104 (polluting the cache and thus reducing the cache hit rate). Embodiments with higher-dimensional guest-to-physical memory page tables may incur extra virtualization overhead (e.g., three-dimensional page tables relative to two-dimensional page tables). Embodiments with cache size limitations may also incur additional virtualization overhead (and may particularly benefit from improved memory management techniques that reduce cache pressure).

The VMM 110 may be a Type-2 VMM, in which the VMM 110 runs within a conventional operating system environment, or a Type-1 VMM, in which the VMM 110 runs directly on host hardware. In embodiments of the latter, the host operating system may run in a separately privileged virtual machine on top of the Type-1 VMM. An example of such an embodiment is the Xen hypervisor.

The host machine 102 may include a storage device 106. The storage device 106 may store instructions for the guest machine 104 and instructions for the host machine 102. Instructions for the host machine 102 may include instructions for the VMM 110. As is conventionally known, the instructions for the guest machine 104 and the instructions for the host machine 102 may be organized into memory pages. Various embodiments of the storage device 106 are discussed below with reference to FIG. 2.

The virtual computing environment 100 may also include memory management logic 108. The memory management logic 108 may be coupled to the storage device 106. In some embodiments (e.g., as discussed below with reference to FIG. 4), the memory management logic 108 may be configured to determine that a first memory page of instructions (stored in the storage device 106) for the guest machine 104 is identical to a second memory page of instructions (stored in the storage device 106) for the host machine 102. The memory management logic 108 may also be configured to, in response to such a determination, map the first memory page to the second memory page (e.g., in a page table). Various embodiments of the memory management logic 108, and memory management techniques, are discussed below with reference to FIGS. 4-7.

Figure 2:
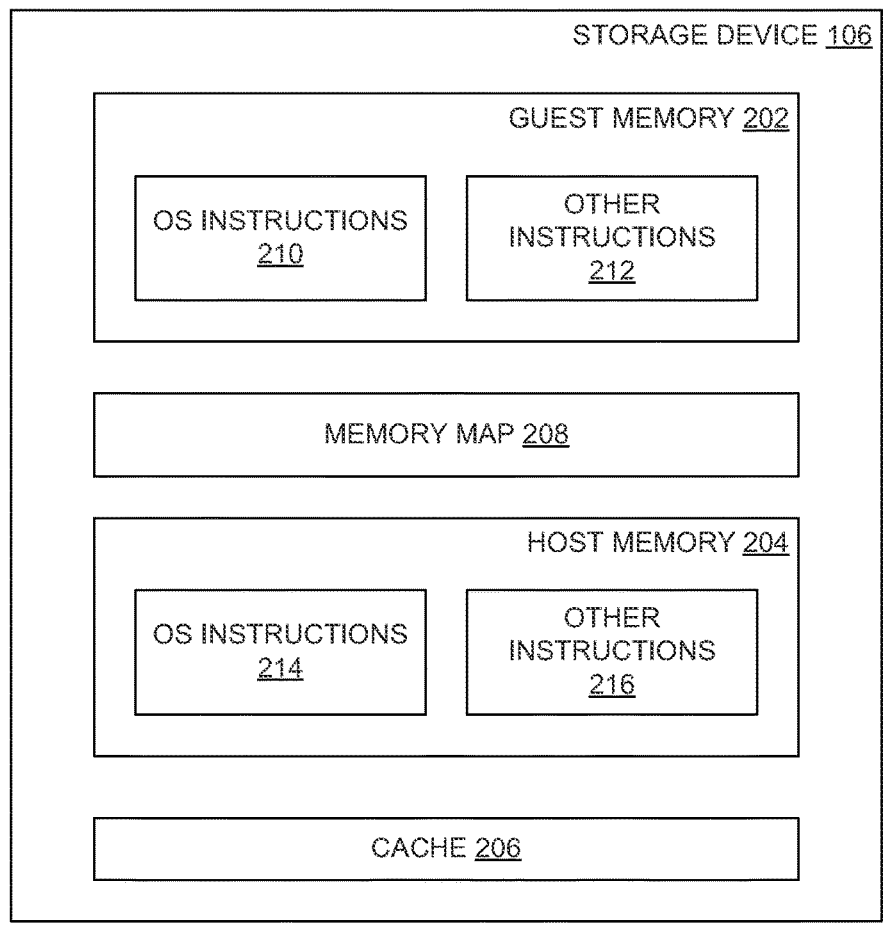
FIG. 2 is a block diagram of a storage device that may be included in a host machine of the virtual computing environment of FIG. 1, in accordance with various embodiments.

FIG. 2 is a block diagram of the storage device 106 of the host machine 102 of the virtual computing environment 100 of FIG. 1, in accordance with various embodiments. The storage device 106 may include guest memory 202, which may store instructions for the guest machine 104. Such instructions may include operating system (OS) instructions 210 and other instructions 212 (e.g., application instructions). The operating system instructions 210 may include instructions for executing the operating system of the guest machine 104 (e.g., kernel instructions). As used herein, a "kernel instruction" may refer to an instruction that relates to the use of a platform's hardware and other resources by software running on the platform. Examples of kernel instructions may include allocating processor time, accessing memory, and performing input/output operations. A kernel may be included in an operating system, and thus kernel instructions may be operating system instructions. In some embodiments, the operating system instructions 210 may include interrupt service routine instructions for managing interrupts to the operating system of the guest machine 104. The guest memory 202 may include any of a number of physical memory devices, and instructions stored in the guest memory 202 may be distributed across any of a number of memory locations.

The storage device 106 may also include host memory 204, which may store instructions for the host machine 102 (e.g., instructions for the VMM 110). Such instructions may include operating system instructions 214 (e.g., kernel instructions) and other instructions 216. The operating system instructions 214 may include instructions for executing the operating system of the host machine 102. In some embodiments, the operating system instructions 214 may include interrupt service routine (ISR) instructions for managing interrupts to the operating system of the host machine 102. The host memory 204 may include any of a number of physical memory devices, and instructions stored in the host memory 204 may be distributed across any of a number of memory locations.

The storage device 106 may also include a memory map 208. The memory map 208 may be a data structure, stored in the storage device 106, that maps guest memory pages (e.g., virtual memory pages corresponding to a guest virtual machine) to physical memory pages (e.g., memory pages in random access memory (RAM)). In some embodiments, the memory map 208 may include one or more page tables, which may include page table entries mapping a particular guest memory address to a physical memory address, or a chained mapping scheme that maps first from a guest virtual address to a guest memory address and then from the guest memory address to a physical memory address. In some embodiments, the memory map 208 may include one or more levels of translation look aside buffers (TLBs), which may be caches of recently used page table entries for quick access to guest-to-physical memory mappings.

The storage device 106 may also include a cache 206. The cache 206 may serve as an intermediate storage location for instructions included in the guest memory 202 (e.g., the operating system instructions 210) and instructions stored in the host memory 204 (e.g., the operating system instructions 214). As known in the art, the cache 206 may provide faster retrieval of the instructions stored therein than retrieval from "mean" memory (e.g., the guest memory 202 and the host memory 204). In some embodiments, a single cache 206 may store instructions for both the guest machine 104 and the host machine 102. For example, a single cache 206 may store instructions for both the guest machine 104 and the VMM 110. In some embodiments, a single cache 206 may store some of the operating system instructions 210 of the guest memory 202 and some of the operating system instructions 214 of the host memory 204. In some embodiments, the cache 206 may include multiple separate caches. These multiple separate caches may include one or more caches dedicated to the guest machine 104, one or more caches dedicated to the host machine 102, and/or one or more caches shared by the guest machine 104 and the host machine 102. The cache 206 may include caches dedicated to different types of data, such as an instruction cache and a data cache. Various embodiments disclosed herein focus on reducing cache pressure in an instruction cache.

Various embodiments disclosed herein may be useful in a virtual computing environment in which one or more host machines are provisioned to host guest machines in response to requests from one or more client machines. In some such environments, the host machines may provide a resource pool from which computing resources may be allocated to client machines to perform requested computing functions. Such environments may be useful for providing hardware as a service, and may be implemented as cloud computing environments.

An example scenario is now discussed to illustrate various embodiments of the memory and resource management techniques discussed herein. As noted above with reference to FIG. 1, the VMM 110 may manage exits and resumes of the guest machine 104. In particular, execution of the guest machine 104 may be interrupted by an exit when, for example, a sensitive instruction is executed by the host machine 102. In an exit, control may pass from the guest machine 104 to the VMM 110. For example, when a physical interrupt occurs at the host machine 102 during the execution of ISR instructions of the guest machine 104, control (e.g., control of the central processing unit of the host hardware) may pass to the VMM 110, which may then hand control to the host machine 102 to process the physical interrupt in accordance with host ISR instructions. After the physical interrupt is processed, the control may go back to the VMM 110, and thereupon back to the guest machine 104, thereby resuming the guest machine 104. In this example, the guest ISR instructions and the host ISR instructions may be located in different physical memory pages in the storage device 320 (e.g., in the guest memory 202 and the host memory 204, respectively). Consequently, a copy of the guest ISR instructions and a copy of the host ISR instructions may be included in the cache 206 if both guest and host ISR instruction fetching is to occur. The cache must be large enough to accommodate both sets of instructions, and the inclusion of both sets of instructions may introduce cache pressure (in additional to the cache fetch cost).

Various embodiments disclosed herein may mitigate the cache pressure and thus reduce the overhead of the above scenario in various ways. For example, in some embodiments, the same physical memory page may be used for both the guest and host ISR instructions. In such embodiments, the processing hardware need only hold one copy of the ISR instructions in the cache, and performance may be improved by avoiding the additional cache load and minimizing the cache pressure. In another example, the host and guest operating systems may be configured so as to have as many common memory pages for hot code (e.g., ISR instructions) as possible, in order to facilitate the memory page sharing noted above. In another example, when the host and guest operating systems are not identical, cache pollution may be mitigated by modifying the memory pages for the hot code in the guest and host to be as identical as possible (e.g., having page alignment and identical contents) in order to facilitate at least some memory page sharing. In some such embodiments, guest and host linkers may cooperate to locate identical instructions and locate the identical instructions with identical page boundaries to facilitate memory page sharing. These and other embodiments are discussed in further detail below.

Figure 3:
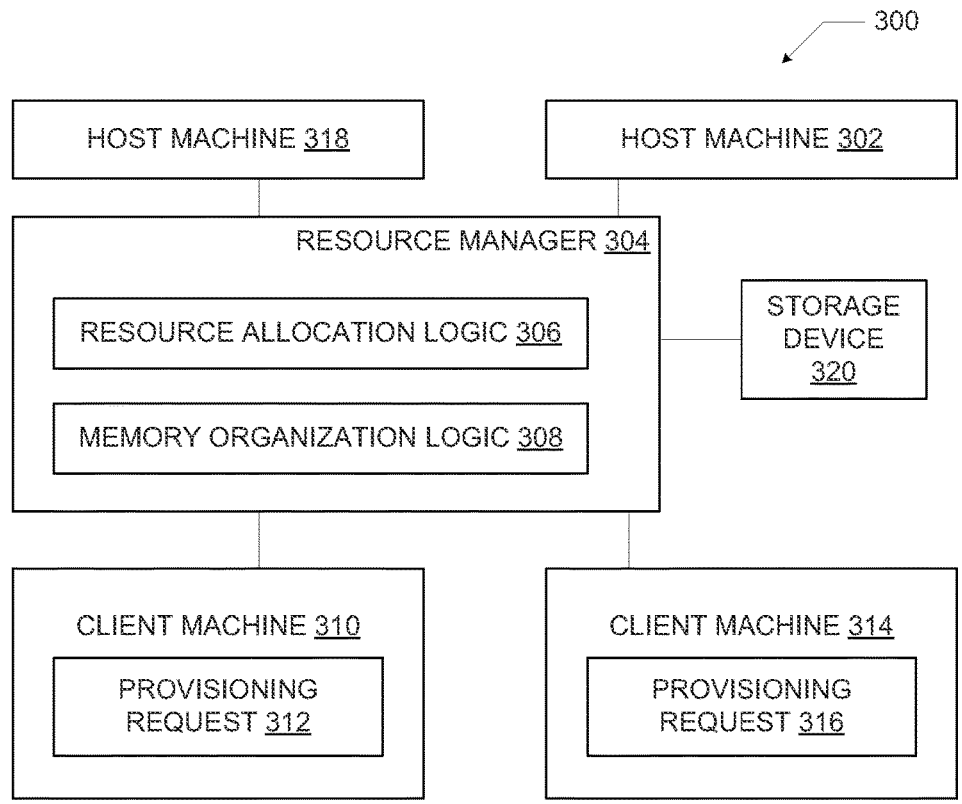
FIG. 3 is a block diagram of a virtual computing environment having multiple host machines and a resource manager to allocate resources of the multiple host machines among multiple client machines, in accordance with various embodiments.

FIG. 3 is a block diagram of a virtual computing environment 300 having multiple host machines and a resource manager 304 to allocate resources of the multiple host machines among multiple client machines, in accordance with various embodiments. In particular, the virtual computing environment 300 may include host machines 318 and 302 and client machines 310 and 314. Although two host machines and two client machines are shown in FIG. 3, this is simply for ease of illustration, and any desired number of host machines (e.g., one or more) and any desired number of client machines (e.g., one or more) may be included in the virtual computing environment 300.

The host machines 318 and 302 may be coupled to the resource manager 304. The resource manager 304 may also be coupled to the client machines 310 and 314. The resource manager 304 may include one or more computing devices configured to perform resource management functions within the virtual computing environment 300. In particular, the resource manager 304 may be configured to receive provisioning requests from the client machines, and attempt to satisfy these provisioning requests by allocating and configuring host machine resources accordingly. A provisioning request from a client machine (e.g., the provisioning request 312 from the client machine 310 or the provisioning request 316 from the client machine 314) may include specifications for a guest machine to be instantiated (e.g., the host machine 318 or the host machine 302). The specifications may include, for example, an operating system of a guest machine. For example, the provisioning request 312 may specify that the client machine 310 wishes to instantiate a guest machine running a Linux operating system. The client machine 310 may provide the provisioning request 312 to the resource manager 304, and the resource manager 304 may determine whether hardware resources (among the host machine 318 and the host machine 302) are available to host such a guest machine, and if so, which of the host machines should be allocated for hosting the guest machine and thereby satisfying the provisioning request 312. The resource manager 304 may also be configured to perform memory organization functions to improve the performance of a guest machine when hosted by the host machine, as discussed below.

The virtual computing environment 300 may include a storage device 320. The storage device 320 may include one or more storage devices that may be included in any of the components of the virtual computing environment 300. For example, the storage device 320 may include storage devices included in each of the host machine 318 and the host machine 302 (e.g., as discussed above with reference to the storage device 106 of the host machine 102). In some embodiments, the storage device 320 may include storage devices separate from the host machines 318 and 302 (e.g., storage devices remote from the host machines 318 and 302). The storage device 320 may include images of guest machines that may be allocated to one or more of the host machines 318 and 302 for hosting. For example, the storage device 320 may include images of guest machines with different operating systems, different software packages, etc. In response to a provisioning request for a guest machine that matches one of these images, the resource manager 304 may retrieve the appropriate image from the storage device 320 and provide it to one of the host machines to instantiate a guest machine with that image.

The host machines 318 and 302 may take the form of any of the embodiments of the host machine 102 discussed herein. In particular, the host machines 318 and 302 may include storage devices (e.g., as discussed above with reference to the storage device 320). The storage device 320 may store instructions for the host machines 318 and 302 (e.g., as discussed above with reference to the host machine 102 and the storage device 106). When hosting a guest machine, the host machines 318 and 302 may interact with the guest machine as discussed herein with reference to the host machine 102 and the guest machine 104, and the storage device 320 may store instructions for the guest machines hosted by the host machines 318 and 302. In particular, in some embodiments, instructions for the host machines 318 and 302 may be stored in storage devices local to the host machines 318 and 302. Before a guest machine is hosted, instructions for that guest machine may be included in the image of the guest machine stored remotely from or local to the host machines 318 and/or 302. In some embodiments, memory management logic 108 (FIG. 1) may be coupled to some or all of the storage devices included in the storage device 320 (e.g., storage devices local to the host machines 318 and 302), while in other embodiments, memory management logic 108 may not be coupled to any of the storage devices included in the storage device 320.

In some embodiments, the resource manager 304 may include resource allocation logic 306. The resource allocation logic 306 may be coupled to the storage device 320, and may be configured to allocate guest machines among the host machines of the virtual computing environment 300 to improve memory access performance. For example, when a guest machine has not yet been assigned to a host or when the guest machine is assigned to the host machine 302, the resource allocation logic 306 may be configured to determine that at least a first memory page of instructions, stored in the storage device 320, for the guest machine is identical to at least a second memory page of instructions, stored in the storage device 320, for the host machine 318. In response to this determination, the resource allocation logic 306 may be configured to assign the guest machine for execution on the host machine 318 (e.g., by initially assigning the guest machine to the host machine 318 or reassigning the guest machine from the host machine 302 to the host machine 318). In some embodiments, the memory pages of instructions compared may be operating system instructions (e.g., kernel instructions). Various embodiments of the resource allocation logic 306 and resource allocation techniques are discussed below with reference to FIGS. 8-9.

In some embodiments, the resource manager 304 may include memory organization logic 308. The memory organization logic 308 may be coupled to the storage device 320, and may be configured to arrange the operating system instructions of a host machine and/or a guest machine to improve memory access performance. For example, when a guest machine has not yet been assigned to the host machine 318, the memory organization logic 308 may determine that a first set of operating system instructions, stored in the storage device 320, for the guest machine is identical to a second set of operating system instructions, stored in the storage device 320, for the host machine 318. In response to this determination, the memory organization logic 308 may arrange the first and/or second sets of operating system instructions within the storage device 320 such that the arranged set of operating system instructions is included in one or more memory pages in the storage device 320, begins at a page boundary of the one or more memory pages, and ends at a page boundary of the one or more memory pages. In other words, the memory organization logic 308 may arrange the "matching" sets of operating system instructions so that they occupy whole memory pages and so that corresponding pages have identical content. Various embodiments of the memory organization logic 308, and memory organization techniques, are discussed below with reference to FIGS. 10-15.

Although the resource manager 304 of FIG. 3 is illustrated as including both the resource allocation logic 306 and the memory organization logic 308, the resource manager 304 may include only one of the resource allocation logic 306 and the memory organization logic 308, but not both.

Figure 4:
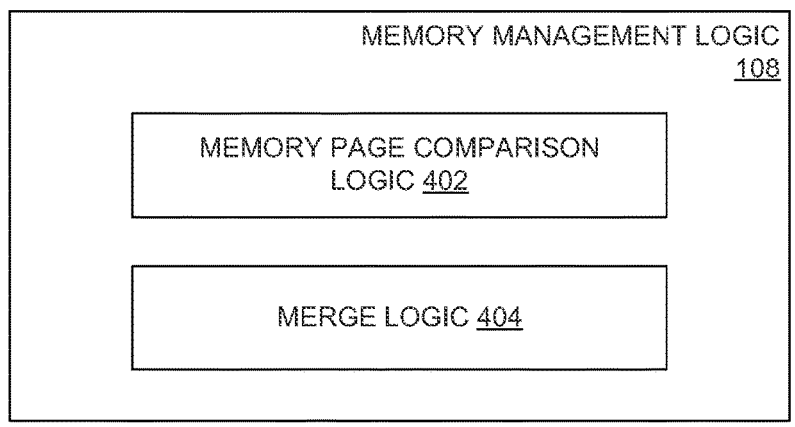
FIG. 4 is a block diagram of memory management logic that may be included in the virtual computing environment of FIG. 1, in accordance with various embodiments.

FIG. 4 is a block diagram of memory management logic 108 that may be included in the virtual computing environment 100 of FIG. 1, in accordance with various embodiments. As noted above, the memory management logic 108 may be coupled with the storage device 106 of the host machine 102.

The memory management logic 108 may include memory page comparison logic 402. The memory page comparison logic 402 may be coupled to the storage device 106, and may be configured to determine whether or not a first memory page of instructions, stored in the storage device 106, for the guest machine 104 is identical to a second memory page of instructions, stored in the storage device 106, for the host machine 102. In some embodiments, the memory pages of instructions analyzed by the memory page comparison logic 402 may be operating system instructions (e.g., the operating system instructions 210 in the guest memory 202 and the operating system instructions 214 in the host memory 204 of FIG. 2). For example, the memory pages of instructions may include ISR instructions. Although the "first memory page" and "second memory page" may be referred to in the singular herein, the memory page comparison logic 402 may determine that multiple memory pages of instructions for a guest machine are identical to multiple corresponding memory pages of instructions for a host machine.

In some embodiments, the memory page comparison logic 402 may be configured to access the first and second memory pages of instructions, and compare all of the data included in the first and second memory pages of instructions character-by-character or bit-by-bit to each other to determine whether or not the two memory pages are identical. In other embodiments, the memory page comparison logic 402 may be configured to determine that the first and second memory pages are identical by comparing hashes of the two memory pages and determining that the compared hashes are identical. As used herein, a "hash" may refer to a value derived from a set of data with the property that the hashes of two different sets of data are likely to be different themselves. In some embodiments, the memory page comparison logic 402 may access the first and second memory pages, compute hashes of each of the first and second memory pages, and then compare the hashes; if the hashes are identical, the memory page comparison logic 402 may determine that the first and second memory pages are identical. The memory page comparison logic 402 may be configured to store the computed hashes in a memory (e.g., the storage device 106) in any suitable data structure and to compare the computed hashes using any suitable comparison technique. For example, a data structure used to store hashes may be a hash table with a collision chain, a link table, a binary tree, or a Red-Black tree.

In some embodiments, the memory page comparison logic 402 may be configured to supplement or replace its page-by-page comparison with an analysis of additional information about the guest machine 104 and the host machine 102. For example, in embodiments in which the storage device 106 stores an identifier of the operating system of the guest machine 104 (e.g., including a name, version number, and any other suitable identifying information) and an identifier of the operating system of the host machine 102 (e.g., including a name, version number, and any other suitable identifying information), the memory page comparison logic 402 may be configured to compare these operating system identifiers prior to performing a page-by-page comparison. If the operating system identifiers are identical, the memory page comparison logic 402 may conclude that the likelihood of identical guest/host memory pages is very high. If the operating system identifiers are not identical, but are similar (e.g., having the same name but different version numbers), the memory page comparison logic 402 may access a list or other data structure in the storage device 106 that stores identifiers of instructions that are shared between the two operating systems (e.g., as previously determined by the memory page comparison logic 402 or another mechanism). The memory page comparison logic 402 may use this list or other data structure to focus its page-by-page comparison so as not to waste time comparing memory pages that are unlikely to match. For example, if the operating system identifiers have a major difference, the memory page comparison logic 402 may focus on instructions related to hardware resources (e.g., interrupt controller, timer, interrupt service routine, etc.) because instructions to operate the same hardware resource are less likely to change. On the other hand, if the operating system identifiers are a match, the memory page comparison logic 402 may also examine instructions implementing "software" features (e.g., memory allocation, data structures, system calls, etc.).

The memory page comparison logic 402 may be configured to perform its determination in accordance with any suitable schedule or set of trigger conditions. For example, in some embodiments, the memory page comparison logic 402 may be configured to make its determination in response to a loading (e.g., resume, boot, or reboot) of the guest machine 104 on the host machine 102. In some embodiments, the memory page comparison logic 402 may be configured to make its determination in response to modification of the contents of the guest memory pages. In some embodiments, the memory page comparison logic 402 may be configured to make its determination as part of a periodic scan of the memory pages of the host machine 102 and the guest machine 104. For example, the memory page comparison logic 402 may periodically compute hashes of the memory pages of the guest machine 104, periodically compute hashes of the memory pages of the host machine 102, and periodically compare the hashes (with the periodicity of these operations being the same or different).

The memory management logic 108 may also include merge logic 404. The merge logic 404 may be coupled to the memory page comparison logic 402, and may be configured to, in response to a determination by the memory page comparison logic 402 that the first memory page of instructions for the guest machine 104 is identical to the second memory page of instructions for the host machine 102, map the first memory page to the second memory page. In some embodiments, mapping the first memory page to the second memory page may include mapping the first memory page to the second memory page in a page table. In some embodiments, mapping the first memory page to the second memory page may include marking the first memory page as copy-on-write. Marking the first memory page as copy-on-write may include marking the first memory page as read-only in a page table (e.g., the host page table and an extended page table (EPT)). The merge logic 404 may be configured to perform its operations in response to a loading of the guest machine 104 on the host machine 102, in response to modification of the contents of the guest memory pages, or as part of a periodic scan of the memory pages of the host machine 102 and the guest machine 104, for example.

If a write operation to the "shared" physical memory page happens (e.g., from either the guest machine 104 or the host machine 102), the merge logic 404 may be configured to end the sharing by copying the shared memory page to a second physical page and remapping the guest memory page to the second physical page.

Figure 5:
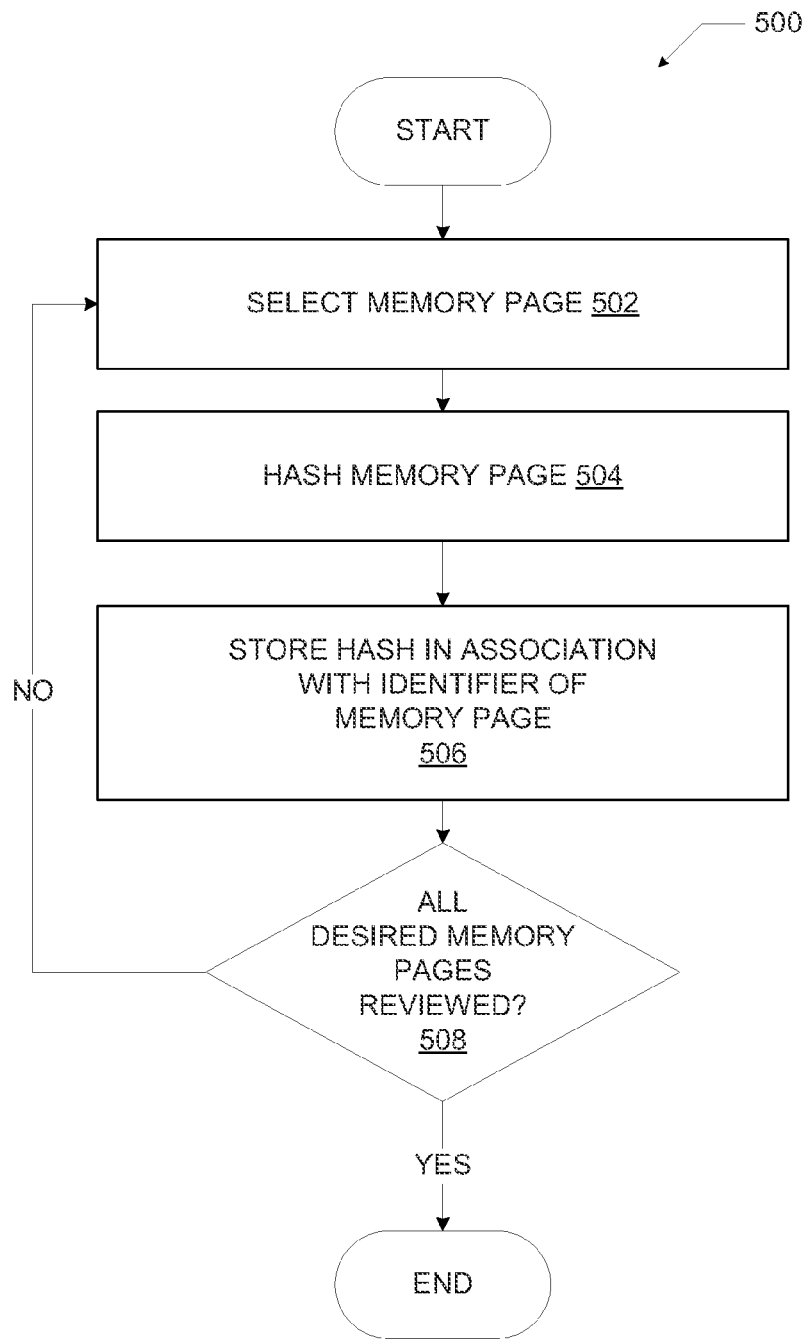
FIG. 5 is a flow diagram of a process for analyzing memory pages, in accordance with various embodiments.
Figure 6:
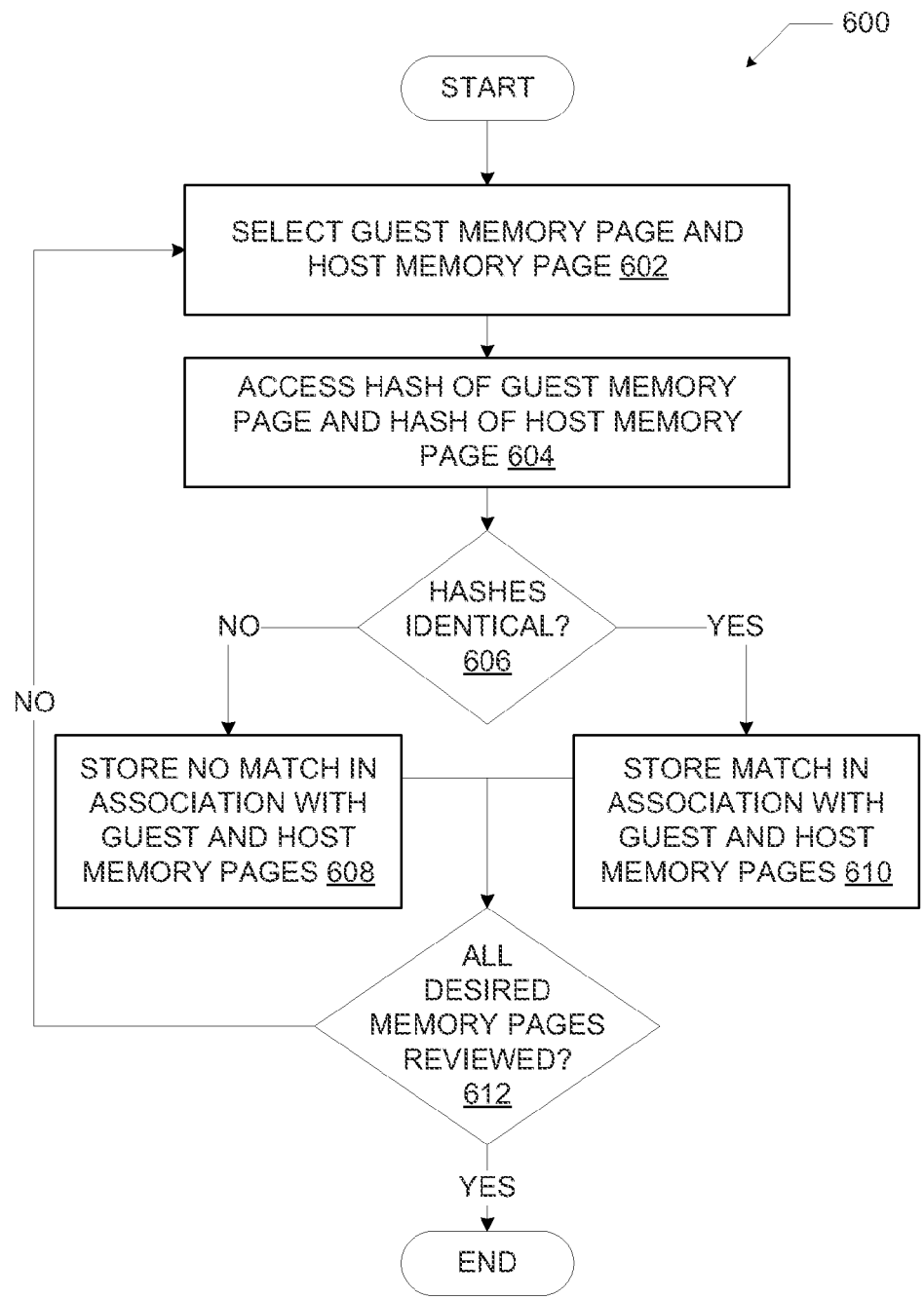
FIG. 6 is a flow diagram of a process for comparing guest and host memory pages, in accordance with various embodiments.
Figure 7:
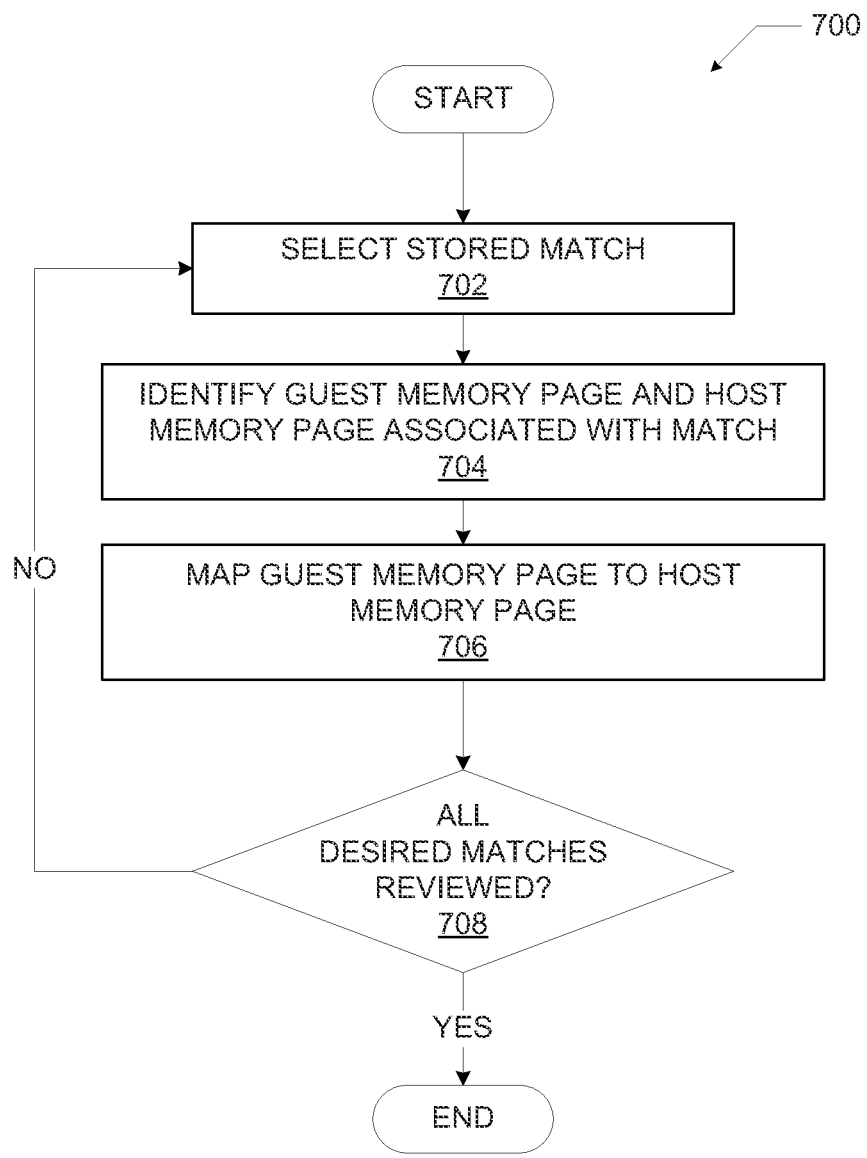
FIG. 7 is a flow diagram of a process for mapping guest memory pages to host memory pages, in accordance with various embodiments.

FIGS. 5-7 are flow diagrams of processes for memory management in a virtual computing environment, in accordance with various embodiments. For ease of illustration, the processes of FIGS. 5-7 may be described as performed by the memory management logic 108 with respect to the host machine 102 and the guest machine 104 in the virtual computing environment 100, but any suitable hardware may be configured to execute these processes.

FIG. 5 is a flow diagram of a process 500 for analyzing memory pages, in accordance with various embodiments. The process 500 may be performed in embodiments in which the memory management logic 108 (e.g., the memory page comparison logic 402) is configured to compare hashes of guest and host memory pages in determining whether the guest and host memory pages are identical. Operations of the process 500 may be discussed as performed by the memory page comparison logic 402, but as noted above, any suitable hardware may be configured to execute the process 500.

The process 500 may begin at 502, at which the memory page comparison logic 402 may select a memory page. The memory page selected at 502 may be a memory page of instructions for the guest machine 104 or a memory page of instructions for the host machine 102. The selection of a memory page at 502 may be made based on a schedule and/or sequentially in a predetermined range or set of memory pages known to include instructions (e.g., operating system instructions) that are to be compared between the guest machine 104 and the host machine 102.

At 504, the memory page comparison logic 402 may compute a hash of the memory page selected at 502. In some embodiments, the memory page comparison logic 402 may only compute a hash at 504 if an existing stored hash of that memory page is older than a predetermined window (and thus should be "refreshed" in case changes have been made to the contents of the memory page) or if the memory page is known to have undergone a change in contents since the last hash. In some embodiments, there may be no existing stored hash of the selected memory page. In some embodiments, the memory page comparison logic 402 may compute a hash of the selected memory page regardless of whether there is an existing stored hash or how current the existing stored hash is.

At 506, the memory page comparison logic 402 may store the hash computed at 504 in a memory (e.g., in the storage device 106). As noted above, memory page hashes may be stored in any suitable memory structure (e.g., for comparison between hashes of memory pages of instructions for guest machines and hashes of memory pages of instructions for host machines).

At 508, the memory page comparison logic 402 may determine whether all desired memory pages have been reviewed for hashing (or simply hashed). This determination may include determining whether the end of a predetermined range or set of memory pages has been reached, and all memory pages in that predetermined range or set have been reviewed. If the memory page comparison logic 402 determines at 508 that there are still memory pages to be reviewed, the memory page comparison logic 402 may return to 502 and select an additional memory page for review. If the memory page comparison logic 402 determines at 508 that all desired memory pages have been reviewed, the process 500 may then end. As noted above, the process 500 may be repeated for various sets of memory pages in accordance with any desired schedule.

FIG. 6 is a flow diagram of a process 600 for comparing guest and host memory pages, in accordance with various embodiments. The process 600 may be performed in embodiments in which the memory management logic 108 (e.g., the memory page comparison logic 402) is configured to compare hashes of guest and host memory pages in determining whether the guest and host memory pages are identical (e.g., as discussed above with reference to FIG. 5), but an analogous process may be followed when the memory management logic 108 is configured to compare guest and host memory pages on a non-hash basis (e.g., by substituting the operations discussed below with reference to 604 and 606 with analogous appropriate operations). Operations of the process 600 may be discussed as performed by the memory page comparison logic 402, but as noted above, any suitable hardware may be configured to execute the process 600.

The process 600 may begin at 602, at which the memory page comparison logic 402 may select a guest memory page and a host memory page. The memory pages selected at 602 may be made based on a schedule and/or sequentially in a predetermined range or set of memory pages known to include instructions (e.g., operating system instructions) that are to be compared between the guest machine 104 and the host machine 102. Any suitable technique for selecting pairs of guest/host memory pages for comparison may be used. In some embodiments, the memory page comparison logic 402 may use information about the operating systems of the guest and host machine to aid the selection of 602. For example, the memory page comparison logic 402 may compare the operating system versions of the guest and host machine to determine whether the operating systems are identical or related (and thus likely to have particular matching memory pages), as discussed above.

At 604, the memory page comparison logic 402 may access hashes of the memory pages selected at 602. These hashes may have been generated as discussed above with reference to FIG. 5, and stored in a memory (e.g., in the storage device 106).

In some embodiments, the operations of 602 and 604 may be combined, and the memory page comparison logic 402 may select a guest memory page and a host memory page by selecting and accessing their corresponding stored hashes. In some embodiments, the memory page comparison logic 402 may only access hashes at 604 if one or both existing stored hashes is older than a predetermined window (and thus the comparison should be "refreshed" in case changes have been made to the contents of one or both memory pages) or if one or both memory pages are known to have undergone a change in contents since the last comparison. In some embodiments, the memory page comparison logic 402 may access hashes of the selected memory pages regardless of how current the existing stored hashes are.

At 606, the memory page comparison logic 402 may determine whether the guest memory page hash and the host memory page hash (accessed at 604) are identical. In some embodiments, this determination may include a character-by-character or bit-by-bit comparison of the hashes. Any suitable comparison technique may be used. If the memory page comparison logic 402 determines at 606 that the hashes are not identical, the memory page comparison logic 402 may proceed to 608 and store a "no match" identifier in a memory in association with the guest memory page and the host memory page (e.g., in the storage device 106). This "no match" identifier may take any suitable form (e.g., a binary indicator of "0") and may be stored in any suitable data structure (e.g., a table in which hashed memory pages of the guest machine correspond to rows and hashed memory pages of the host machine correspond to columns) so that the result that the guest memory page hash and the host memory page hash were not identical can be readily determined.

If the memory page comparison logic 402 determines at 606 that the hashes are identical, the memory page comparison logic 402 may proceed to 610 and may store a "match" identifier in a memory in association with the guest memory page and the host memory page (e.g., in the storage device 106). This "match" identifier may take any suitable form (e.g., a binary indicator of "1") and may be stored in any suitable data structure (e.g., a table in which hashed memory pages of the guest machine correspond to rows and hashed memory pages of the host machine correspond to columns) so that the result that the guest memory page hash and the host memory page hash were identical can be readily determined.

At 612, the memory page comparison logic 402 may determine whether all desired memory pages (e.g., all desired pairs of memory pages) have been reviewed for identical hashes. This determination may include determining whether the end of a predetermined range or set of memory pages has been reached, and all memory pages in that predetermined range or set have been reviewed. If the memory page comparison logic 402 determines at 612 that there are still memory pages to be reviewed, the memory page comparison logic 402 may return to 602 and select additional memory pages for review. If the memory page comparison logic 402 determines at 612 that all desired memory pages have been reviewed, the process 600 may then end. As noted above, the process 600 may be repeated for various sets of memory pages in accordance with any desired schedule. The schedule on which the process 600 is performed may be related to or may be independent from the schedule on which the process 500 is performed.

FIG. 7 is a flow diagram of a process 700 for mapping guest memory pages to host memory pages, in accordance with various embodiments. The process 700 may be performed in embodiments in which the memory management logic 108 (e.g., the merge logic 404) is configured to compare hashes of guest and host memory pages (e.g., as discussed above with reference to FIGS. 6 and 7) or configured to compare guest and host memory pages in any other manner. Operations of the process 700 may be discussed as performed by the merge logic 404, but as noted above, any suitable hardware may be configured to execute the process 700.

The process 700 may begin at 702, at which the merge logic 404 may select a stored "match" identifier between a guest memory page and a host memory page. As discussed above with reference to 608 and 610 of FIG. 6, data indicative of whether or not a guest memory page was determined to be identical to a host memory page may be stored in a memory (e.g., in the storage device 106) in any suitable data structure (e.g., a table including "match" and "no match" identifiers). Thus, at 702, the merge logic 404 may access this data structure to select a "match" identifier (if one exists). The merge logic 404 may use any suitable technique or follow any suitable pattern to review and select a stored "match" identifier (e.g., element-by-element review).

At 704, the merge logic 404 may identify the memory pages associated with the "match" identifier selected at 702. In some embodiments, the data structure used to store the "match" and "no match" identifiers (e.g., as discussed above with reference to 608 and 610 of FIG. 6) may include links or pointers to the guest and host memory pages associated with the "match" and "no match" identifiers so that the associated guest and host memory pages may be readily identified. In other embodiments, a look-up table or other data structure may be used to determine which guest and host memory pages are associated with a particular "match" or "no match" identifier. In some embodiments, the merge logic 404 may identify the guest and host memory pages at 704 by identifying physical memory addresses for each of the guest and host memory pages.

At 706, the merge logic 404 may map the guest memory page (identified at 704 and associated with the "match" identifier selected at 702) to the host memory page (identified at 704 and associated with the "match" identifier selected at 702). In some embodiments, the merge logic 404 may map the guest memory page to the host memory page at 706 in a page table. In some embodiments, the merge logic 404 may mark the guest memory page as read-only upon mapping the guest memory page to the host memory page.

At 708, the merge logic 404 may determine whether all desired matches (e.g., all desired pairs of memory pages associated with "match" identifiers) have been reviewed. This determination may include determining whether the end of a data structure including the "match" identifiers has been reached, and all matches in that data structure have been reviewed. If the merge logic 404 determines at 708 that there are still matches to be reviewed, the merge logic 404 may return to 702 and select another "match" identifier for review. If the merge logic 404 determines at 708 that all desired matches have been reviewed, the process 700 may then end. As noted above, the process 700 may be repeated for various matches in accordance with any desired schedule. The schedule on which the process 700 is performed may be related to or may be independent from the schedule on which the processes 500 and 600 are performed.

As discussed above, in some embodiments, the virtual computing environment 300 may include a resource manager 304 configured to perform resource management functions. The resource manager 304 may include resource allocation logic 306 and/or memory organization logic 308. The resource allocation logic 306 may be configured to assign guest machines to host machines to improve memory access performance. The memory organization logic 308 may be configured to organize instruction sets for guest machines and host machines to improve memory access performance.

Figure 8:
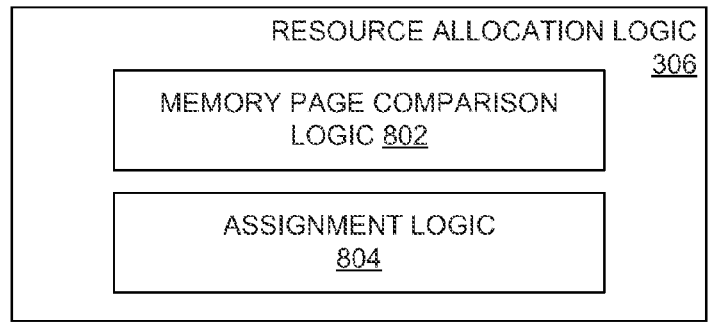
FIG. 8 is a block diagram of resource allocation logic that may be included in the resource manager of the virtual computing environment of FIG. 3, in accordance with various embodiments.

Various embodiments of the resource allocation logic 306, and resource allocation techniques, are now discussed with reference to FIGS. 8-9. To begin, FIG. 8 is a block diagram of the resource allocation logic 306 that may be included in the resource manager 304 of the virtual computing environment 300 of FIG. 3, in accordance with various embodiments. As noted above, the resource allocation logic 306 may be coupled with the storage device 320 (which may include storage devices in the host machines 318 and 302 and storage devices separate from the host machines 318 and 302).

The resource allocation logic 306 may include memory page comparison logic 802. The memory page comparison logic 802 may be coupled to the storage device 320, and may substantially take the form of any of the embodiments discussed above with reference to the memory page comparison logic 402 (FIG. 4), but may be configured to analyze and compare memory pages of instructions for a guest machine and a candidate host machine. In particular, the memory page comparison logic 802 may be configured to compare memory pages of instructions for the guest machine and memory pages of instructions for the host machine 318 before the guest machine has been assigned to any host machine in the virtual computing environment 300 and/or when the guest machine has been assigned to another host machine in the virtual computing environment 300 (e.g., the host machine 302). As discussed herein, a purpose of the operations performed by the memory page comparison logic 802 may be to determine whether any memory pages of instructions for the guest machine are identical to any memory pages of instructions for the host machine to determine the suitability of an assignment between the guest machine and the host machine. In some embodiments, the memory management logic 108 may perform its operations with respect to a guest machine and more than one potential host machine to determine which potential host machines may be most suitable for hosting the guest machine (e.g., because of the greatest number of identical memory pages, types of identical memory pages, or other criteria related to the identicality of memory pages). These operations may be performed before the guest machine is assigned to any host machine, or after the guest machine has been assigned to a host machine. In the latter case, if another host machine is identified that is more suitable for hosting the guest machine, the guest machine may be live migrated to the other host machine.

As discussed above with reference to the memory page comparison logic 402, the memory page comparison logic 802 may be configured to determine whether or not a first memory page of instructions, stored in the storage device 320, for a guest machine is identical to a second memory page of instructions, stored in the storage device 320, for a host machine (e.g., the host machine 318 or the host machine 302). In some embodiments, the storage device 320 may include storage devices local to the host machines 318 and 302 and a storage device remote from the host machines 318 and 302; in some such embodiments, the memory pages of the guest machine may be stored as an image in the "remote" storage device while the memory pages of the host machines may be stored in their respective "local" storage devices. In some embodiments, copies of the memory pages of the host machines may be stored locally to the memory pages of the guest machine for ready comparison by the memory page comparison logic 802. In some embodiments, the memory pages of instructions analyzed by the memory page comparison logic 802 may be operating system instructions. For example, the memory pages of instructions may include ISR instructions.

As discussed above with reference to the memory page comparison logic 402, in some embodiments, the memory page comparison logic 802 may be configured to supplement or replace its page-by-page comparison with an analysis of additional information about the guest machine and the host machine. For example, in embodiments in which the storage device 320 stores an identifier of the operating system of the guest machine (e.g., including a name, version number, and any other suitable identifying information) and an identifier of the operating system of the host machine 302 (e.g., including a name, version number, and any other suitable identifying information), the memory page comparison logic 802 may be configured to compare these operating system identifiers prior to performing a page-by-page comparison. If the operating system identifiers are identical or related, as discussed above, the memory page comparison logic 402 may conclude that there are (or are likely to be) guest and host memory pages that are identical and modify its comparisons accordingly.

In some embodiments, the memory page comparison logic 802 may be configured to access the first and second memory pages of instructions, and compare all of the data included in the first and second memory pages of instructions character-by-character or bit-by-bit to each other to determine whether or not the two memory pages are identical. In other embodiments, the memory page comparison logic 802 may be configured to determine that the first and second memory pages are identical by comparing hashes of the two memory pages and determining that the compared hashes are identical. In particular, the memory page comparison logic 802 may be configured to execute the processes 500 and 600 of FIGS. 5 and 6, respectively, to compute and compare hashes of memory pages (or otherwise compare memory pages). Although the "first memory page" and "second memory page" may be referred to in the singular herein, the memory page comparison logic 802 may determine that multiple memory pages of instructions for a guest machine are identical to multiple corresponding memory pages of instructions for a host machine.

As noted above with reference to the memory page comparison logic 402, the memory page comparison logic 802 may be configured to perform its determination in accordance with any suitable schedule or set of trigger conditions. For example, in some embodiments, the memory page comparison logic 802 may be configured to make its determination in response to receipt of a provisioning request for the guest machine (e.g., the provisioning request 312 or 316). In some embodiments, the memory page comparison logic 802 may be configured to make its determination as part of a periodic scan of the memory pages of the host machines 318 and 302 and the guest machines requested for or hosted on the host machines 318 and 302.

The resource allocation logic 306 may also include assignment logic 804. The assignment logic 804 may be coupled to the memory page comparison logic 802 and may be configured to, in response to a determination by the memory page comparison logic 802 that the first memory page is identical to the second memory page, assign the guest machine for execution on the host machine. In some embodiments, the determination by the memory page comparison logic 802 that the first memory page is identical to the second memory page may be included in an analysis by the assignment logic 804 as to whether a set of assignment criteria is satisfied. In particular, in some embodiments, the assignment logic 804 may be configured to receive information about identical memory pages from the memory page comparison logic 802 and compare that information to a set of assignment criteria. If a host machine/guest machine pair satisfies the assignment criteria, the host machine may be assigned to the guest machine.

The assignment criteria may be stored in a memory (e.g., the storage device 320) and may be accessible by the assignment logic 804 in determining whether to assign the guest machine for hosting on a host machine. Any suitable criteria may be included in the assignment criteria. For example, in embodiments of the virtual computing environment 300 in which different host machines execute different operating systems, the assignment criteria may specify that the guest machine is to be allocated to the host machine having the most operating system instruction memory pages in common with the guest machine. In some embodiments, the assignment criteria may specify that the guest machine is to be allocated to the host machine having the most "hot code" memory pages in common with the guest machine. In some embodiments, the assignment criteria may include mitigating conditions that require that the otherwise "optimal" host machine (e.g., in terms of assignment conditions that relate to identical memory pages) also have other characteristics suitable for hosting the guest machine (e.g., available memory and processing power). In embodiments in which the guest machine is already executing on a "sub-optimal" host machine, the assignment logic 804 may assign the guest machine to another "optimal" host machine by live migrating the guest machine. The assignment logic 804 may also use dynamic profiling criteria, such as cache hit rate, to determine whether a current assignment of guest to host is likely to be sub-optimal.

In some embodiments, the resource allocation logic 306 may be configured to attempt to use the same binary for both the guest machine and the host machine. In some embodiments, the attempt to use the same binary may focus on using the same binary for at least the kernel instructions of the host machine and guest machine. For example, the resource allocation logic 306 may be configured to attempt to match a guest machine with a host machine having the same kernel version.

Figure 9:
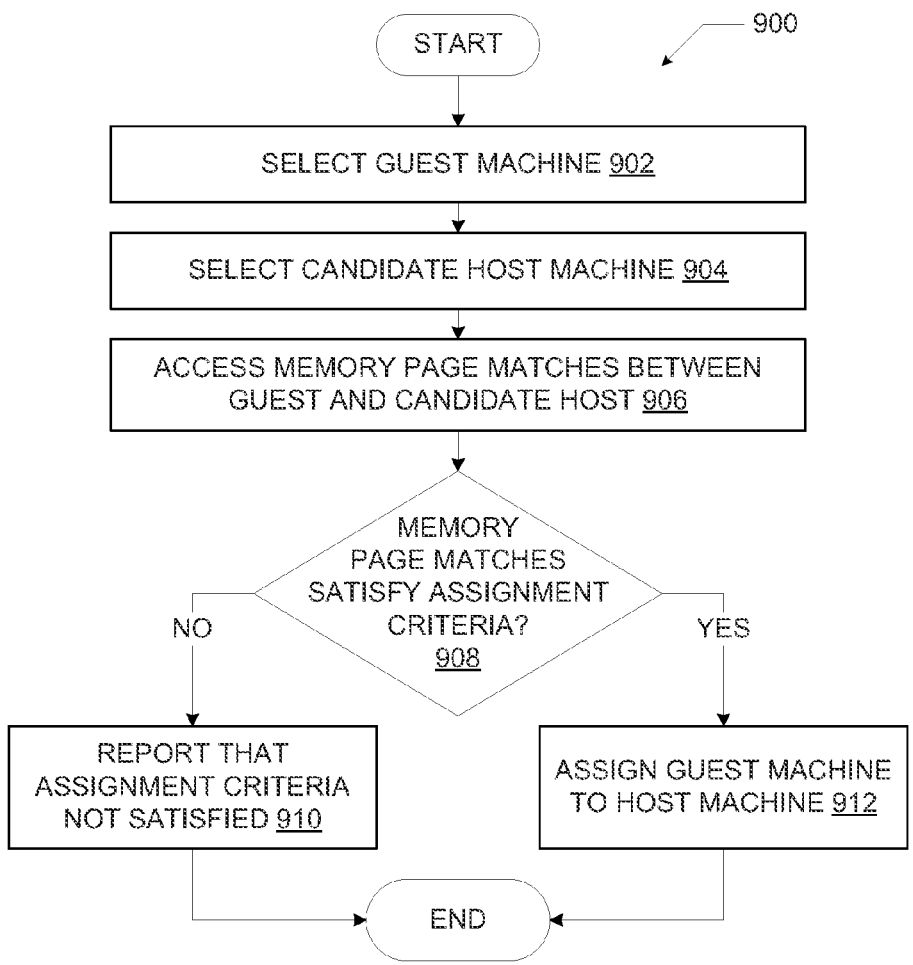
FIG. 9 is a flow diagram of a process for assigning guest machines to host machines in the virtual computing environment of FIG. 3, in accordance with various embodiments.

FIG. 9 is a flow diagram of a process 900 for assigning guest machines to host machines in the virtual computing environment 300 of FIG. 3, in accordance with various embodiments. For ease of illustration, the process of FIG. 9 may be described as performed by the resource allocation logic 306 (e.g., the memory page comparison logic 802) and the assignment logic 804 with respect to the host machine 318 and a guest machine in the virtual computing environment 300, but any suitable hardware may be configured to execute the process 900.

At 902, the resource allocation logic 306 (e.g., the memory page comparison logic 802) may select a guest machine. The guest machine selected at 902 may be assigned to a host machine other than the host machine 318 (e.g., the host machine 302) or may have been the subject of a provisioning request and may not yet be assigned.

At 904, the resource allocation logic 306 (e.g., the memory page comparison logic 802) may select a candidate host machine (in this discussion, the host machine 318). The candidate host machine may be a host machine that is not currently hosting the guest machine selected at 902, but to which the guest machine selected at 902 may be assigned.

At 906, the resource allocation logic 306 (e.g., the memory page comparison logic 802) may access a set of previously determined memory page matches. The memory page matches may indicate which memory pages of the guest machine and which memory pages of the host machine 318 were determined to be identical. In some embodiments, the resource allocation logic 306 may generate this set of memory page matches in accordance with any of the techniques disclosed herein (the processes discussed above with reference to FIGS. 5-6). In some embodiments, the set of memory page matches may be generated by other logic. Accessing the matches at 906 may take the form of any of the embodiments discussed above with reference to 702 and 704 of FIG. 7.

At 908, the resource allocation logic 306 (e.g., the assignment logic 804) may determine whether the memory page matches accessed at 906 satisfy the assignment criteria. As discussed above, the assignment criteria may include any suitable one or more rules for determining whether a guest machine is appropriately assigned for execution on the host machine 318.

If the resource allocation logic 306 determines at 908 that the memory page matches do not satisfy the assignment criteria, the resource allocation logic 306 (e.g., the assignment logic 804) may proceed to 910 and report that the assignment criteria have not been satisfied. This report may be provided to a system administrator of the virtual computing environment 300 or to internal logic of the virtual computing environment 300 (e.g., internal logic of the resource manager 304). For example, in some embodiments, the report may be provided to the memory page comparison logic 802, which may be configured to respond by selecting another candidate host machine in initiating the process 900 with respect to this new candidate. In some embodiments, in response to this report, a system administrator may manually select a host machine to which the guest machine may be assigned. In some embodiments, in response to this report, other logic of the resource manager 304 may apply other criteria to allocate the guest machine to a suitable host machine. In some embodiments, the support may be provided to the client machine (e.g., the client machine 310 or 314) that provided the provisioning request (e.g., the provisioning request 312 or 316) for the guest machine.

If the resource allocation logic 306 determines at 908 that the memory page matches do satisfy the assignment criteria, the resource allocation logic 306 (e.g., the assignment logic 804) may proceed to 912 and assign the guest machine to the host machine 318. In embodiments in which the guest machine was not previously assigned to the host machine, the assignment of 912 may be the initial assignment of the guest machine. In embodiments in which the guest machine was previously assigned to another host machine, the assignment of 912 may include a live migration of the guest machine to the host machine 318. The process 900 may then end.

Figure 10:
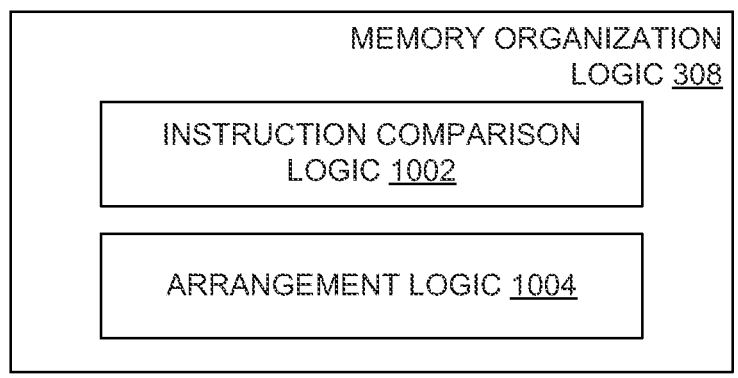
FIG. 10 is a block diagram of memory organization logic that may be included in the resource manager of the virtual computing environment of FIG. 3, in accordance with various embodiments.

As noted above, the resource manager 304 may include memory organization logic 308. Various embodiments of the memory organization logic 308, and memory organization techniques, are now discussed below with reference to FIGS. 10-15. To begin, FIG. 10 is a block diagram of memory organization logic 308 that may be included in the resource manager 304 of the virtual computing environment 300 of FIG. 3, in accordance with various embodiments. As noted above, the memory organization logic 308 may be coupled to the storage device 320 (which may include storage devices in the host machines 318 and 302 and storage devices separate from the host machines 318 and 302).

The memory organization logic 308 may include instruction comparison logic 1002. The instruction comparison logic 1002 may be coupled to the storage device 320 and may be configured to determine that a first set of operating system instructions, stored in the storage device 320, for a guest machine in the virtual computing environment 300 is identical to a second set of operating system instructions, stored in the storage device 320, for a host machine in the virtual computing environment 300 (e.g., the host machine 318 or 302). In some embodiments, the instruction comparison logic 1002 may take a similar form as any of the embodiments discussed above with reference to the memory page comparison logic 402 (FIG. 4) or the memory page comparison logic 802 (FIG. 8), but may be configured to analyze and compare individual instructions and/or groups of instructions for a guest machine and a candidate host machine, rather than whole memory pages. In particular, the instruction comparison logic 1002 may be configured to compare instructions for the guest machine and memory pages of instructions for the candidate host machine before the guest machine has been assigned to any host machine in the virtual computing environment 300 and/or when the guest machine has been assigned to another host machine in the virtual computing environment 300. As discussed herein, a purpose of the operations performed by the instruction comparison logic 1002 may be to determine whether any operating system instructions for the guest machine are identical to any operating system instructions for the host machine to determine how best to arrange the operating system instructions of the guest machine and/or host machine to achieve improved memory page alignment between the guest machine and the host machine. In some embodiments, the memory organization logic 308 may perform its operations with respect to a guest machine and more than one potential host machine.

As noted above, in some embodiments, the storage device 320 may include storage devices local to the host machines 318 and 302 and a storage device remote from the host machines 318 and 302; in some such embodiments, the instructions of the guest machine may be stored as an image in the "remote" storage device while the instructions of the host machines may be stored in their respective "local" storage devices. In some embodiments, copies of the instructions of the host machines may be stored locally to the memory pages of the guest machine for ready comparison by the instruction comparison logic 1002. In some embodiments, as noted above, the instructions analyzed by the instruction comparison logic 1002 may be operating system instructions. For example, the instructions may include ISR instructions.

As discussed above with reference to the memory page comparison logic 402 and the memory page comparison logic 802, in some embodiments, the instruction comparison logic 1002 may be configured to supplement or replace its instruction-by-instruction or instruction set-by-instruction set comparison with an analysis of additional information about the guest machine and the host machine. For example, in embodiments in which the storage device 320 stores an identifier of the operating system of the guest machine (e.g., including a name, version number, and any other suitable identifying information) and an identifier of the operating system of the host machine 302 (e.g., including a name, version number, and any other suitable identifying information), the instruction comparison logic 1002 may be configured to compare these operating system identifiers prior to performing an instruction comparison. If the operating system identifiers are identical or related, as discussed above, the instruction comparison logic 1002 may conclude that there are (or are likely to be) guest and host instructions that are identical and modify its comparisons accordingly.

In some embodiments, the instruction comparison logic 1002 may be configured to access the first and second instruction sets, and compare all of the data included in the first and second instruction sets character-by-character or bit-by-bit to each other to determine whether or not the two instruction sets are identical. In other embodiments, the instruction comparison logic 1002 may be configured to determine that the first and second instruction sets are identical by comparing hashes of the two instruction sets and determining that the compared hashes are identical. In particular, the instruction comparison logic 1002 may be configured to execute processes similar to the processes 500 and 600 of FIGS. 5 and 6, respectively, to compute and compare hashes of instruction sets (or otherwise compare instruction sets). Although the "first instruction set" and "second instruction set" may be referred to in the singular herein, the instruction comparison logic 1002 may determine that multiple instruction sets for a guest machine are identical to multiple corresponding instruction sets for a host machine (e.g., as discussed in the example of FIGS. 12 and 13 below).

As noted above with reference to the memory page comparison logic 402 and the memory page comparison logic 802, the instruction comparison logic 1002 may be configured to perform its determination in accordance with any suitable schedule or set of trigger conditions. For example, in some embodiments, the instruction comparison logic 1002 may be configured to make its determination in response to receipt of a provisioning request for the guest machine (e.g., the provisioning request 312 or 316). In some embodiments, the memory page comparison logic 802 may be configured to make its determination as part of a periodic scan of the memory pages of the host machines 318 and 302 and the guest machines requested for or hosted on the host machines 318 and 302. In some embodiments, the instruction comparison logic 1002 may be configured to perform its determination when a host machine with a not-previously analyzed operating system is introduced into the virtual computing environment 300 and/or when a guest machine with a not-previously analyzed operating system is introduced into the virtual computing environment 300.

The memory organization logic 308 may also include arrangement logic 1004. The arrangement logic 1004 may be coupled to the instruction comparison logic 1002 and may be configured to, in response to a determination by instruction comparison logic 1002 that the first set of operating system instructions are identical to the second set of operating system instructions, arrange the first set of operating system instructions and/or the second set of operating system instructions so that the distribution across memory pages of the first operating system instructions and/or the second set of operating system instructions better match. In particular, in some embodiments, upon rearrangement by the arrangement logic 1004, the first set of operating system instructions and/or the second set of operating system instructions may be included in one or more memory pages in the storage device 320, may begin a page boundary of the one or more memory pages, and may end at a page boundary of the one or more memory pages. Arranging the first set of instructions and/or the second set of instructions so that the first set of instructions and the second set of instructions take up whole memory pages and are distributed identically within those memory pages may allow the memory pages to be shared between the guest machine and the host machine, with the attendant memory access performance improvements discussed above with reference to FIG. 1. Rearranging instructions to improve the "matching" between memory pages so that whole memory pages of the guest are identical to whole memory pages of the host may be referred to herein as achieving matching page granularity.

Figure 11:
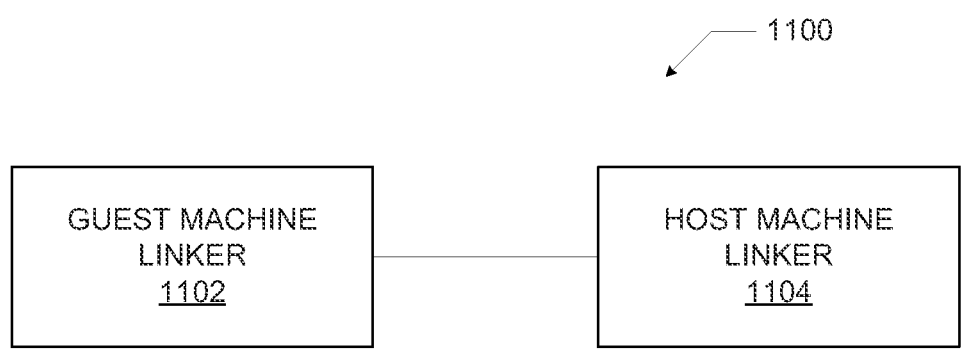
FIG. 11 is a block diagram of a virtual computing environment in which a guest machine linker is in communication with a host machine linker, in accordance with various embodiments.

In some embodiments, the instruction arrangement logic 1004 may be included in a linker for the guest machine and/or in a linker for the host machine. As used herein, a "linker" may refer to a set of logic that combines instructions into an executable program in an address space. In some embodiments, a linker may combine the object files generated by a compiler (as well as objects from a library) and arrange the objects in an address space. FIG. 11 is a block diagram of a virtual computing environment 1100, which may be included in the virtual computing environment 300, in which a guest machine linker 1102 is in communication with a host machine linker 1104, in accordance with various embodiments. In some embodiments, the arrangement logic 1004 may be included in the guest machine linker 1102, and the arrangement logic 1004 may be configured to arrange the instructions for the guest machine for a desired memory page granularity. In some such embodiments, the instruction comparison logic 1002 may be configured to communicate with the host machine linker 1104 to determine that the first set of operating system instructions is identical to the second set of operating system instructions.

In some embodiments, the arrangement logic 1004 may be included in the guest machine linker 1102, and the arrangement logic 1004 may be configured to arrange instructions for the host machine for a desired memory page granularity. In some such embodiments, the instruction comparison logic 1002 may be configured to communicate with the guest machine linker 1102 to determine that the first set of operating system instructions is identical to the second set of operating system instructions. In some embodiments, both the guest machine linker 1102 and the host machine linker 1104 may be configured with arrangement logic 1004 so that the instructions for the guest machine and the instructions for the host machine may both be arranged so as to further improve the matching page granularity between the guest machine and the host machine.

In some embodiments, the memory organization logic 308 may take advantage of the observation that typical operating systems (like Linux) have a fairly stable code base for key kernel components (such as ISR code and page fault handling code). Consequently, subsequent versions of those operating systems may utilize these same key kernel components, and may thus be amenable to memory organization techniques in which identical instructions are selected and arranged with matching page granularity. In some embodiments, a developer may intentionally develop the guest operating system kernel and the host operating system kernel to use identical source code and to compile to identical binary code with matching page granularity (e.g., at least for hot code).

Figure 12:
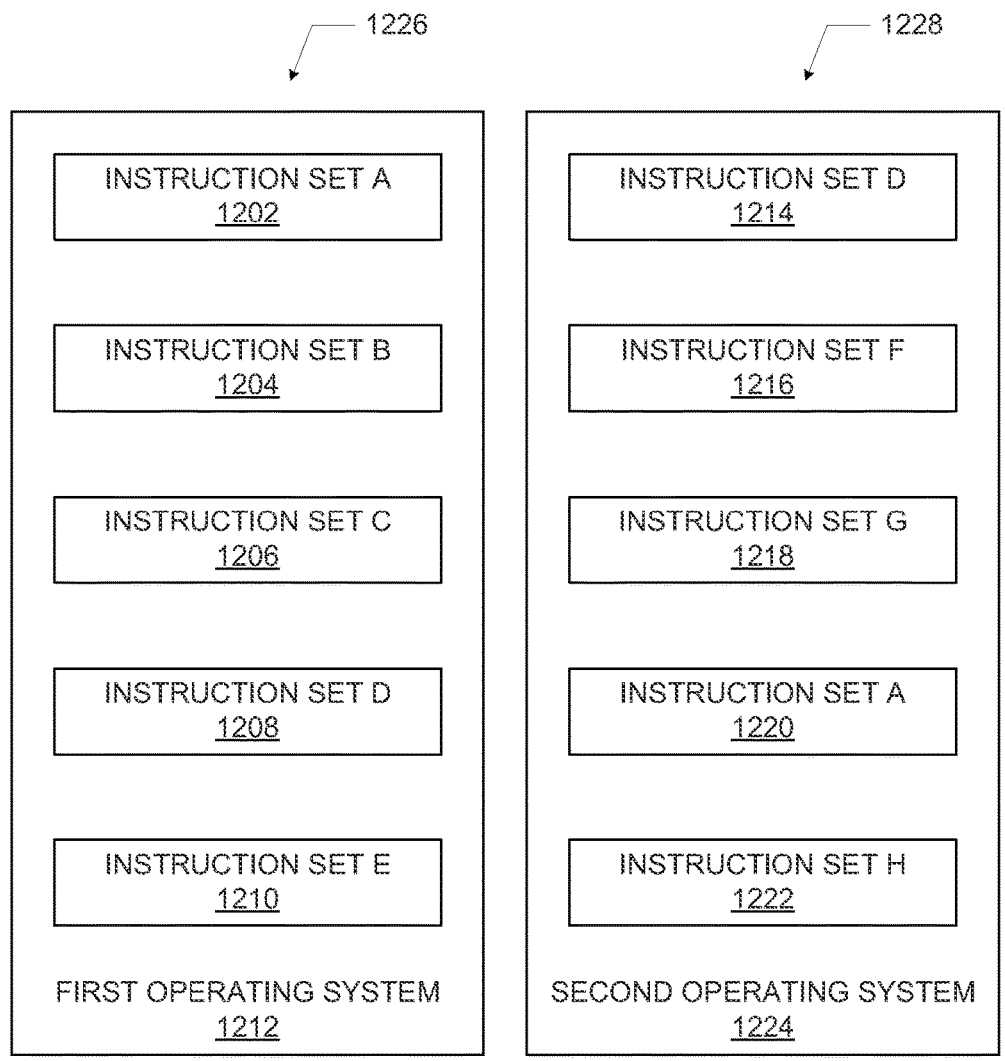
FIG. 12 illustrates an arrangement of instruction sets included in a first operating system and an arrangement of instruction sets included in a second operating system, in accordance with various embodiments.
Figure 13:
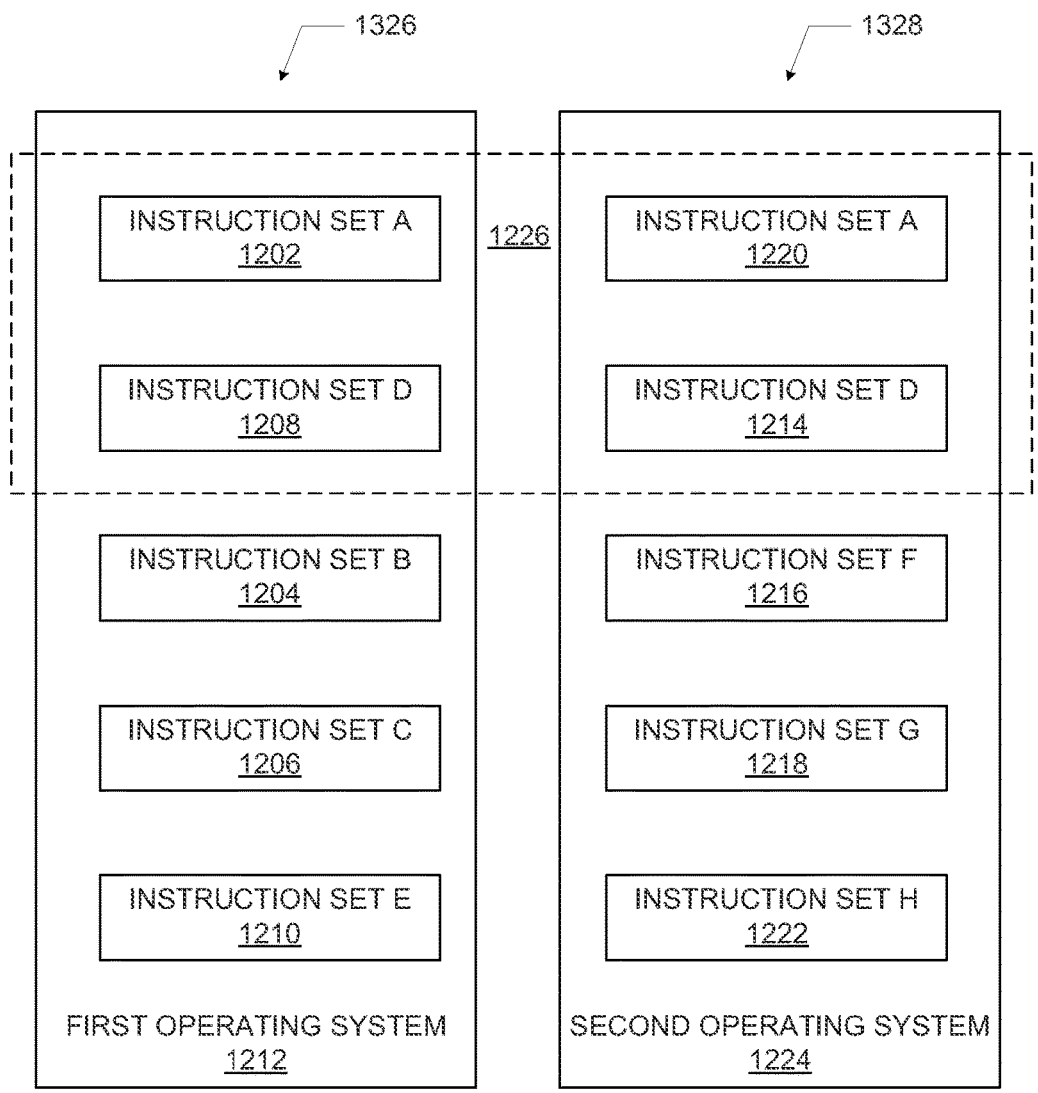
FIG. 13 illustrates an arrangement of the instruction sets included in the first operating system of FIG. 12, different from the arrangement of FIG. 12, and an arrangement of instruction sets included in the second operating system, different from the arrangement of FIG. 12, in accordance with various embodiments.

FIGS. 12 and 13 illustrate various arrangements of instructions for two different operating systems before (FIG. 12) and after (FIG. 13) the memory organization operations of the memory organization logic 308. In particular, FIG. 12 illustrates an arrangement 1226 of instruction sets included in a first operating system 1212 and an arrangement 1228 of instruction sets included in a second operating system 1224, in accordance with various embodiments. The first operating system 1212 may be, for example, an operating system of a guest machine, and the second operating system 1224 may be, for example, an operating system of a candidate host machine.

The arrangement 1226 may include instruction set A 1202, instruction set B 1204, instruction set C 1206, instruction set D 1208, and instruction set E 1210. The instruction sets 1202-1210 may be distributed in a storage device (e.g., the storage device 320) in the arrangement schematically shown. The arrangement 1228 may include the instruction set D 1214, the instruction set F 1216, the instruction set G 1218, the instruction set A 1220, and the instruction set H 1222. The instruction sets 1214-1222 may be distributed in a storage device (e.g., the storage device 320) in the arrangement schematically shown. When the memory organization logic 308 analyzes the arrangements 1226 and 1228, the instruction comparison logic 1002 may determine that the instruction set A 1202 of the first operating system 1212 is identical to the instruction set A 1220 of the second operating system 1224, and the instruction set D 1208 of the first operating system 1212 is identical to the instruction set D 1214 of the second operating system 1224.

Upon the determination by the instruction comparison logic 1002 that certain instruction sets of the first operating system 1212 match certain instruction sets of the second operating system 1224, the arrangement logic 1004 (having counterparts in the linker associated with the first operating system 1212 and in the linker associated with the second operating system 1224) may rearrange the instruction sets of the first operating system 1212 and the second operating system 1224 to improve the matching page granularity. In particular, FIG. 13 illustrates an arrangement 1326 of the instruction sets included in the first operating system 1212 of FIG. 12, different from the arrangement 1226 of FIG. 12, and an arrangement 1328 of instruction sets included in the second operating system 1224, different from the arrangement 1228 of FIG. 12, in accordance with various embodiments. The arrangements 1326 and 1328 of FIG. 13 may represent the new arrangements after operation of the instruction arrangement logic 1004. As shown in FIG. 13, the instruction sets that are identical between the first operating system 1212 and the second operating system 1224 (namely, the instruction sets A 1202 and 1220, and the instruction sets D 1208 and 1214) may be arranged within the physical memory so that identical instructions are identically distributed among memory pages (e.g., with respect to memory page boundaries). In particular, the identical instruction sets may be arranged so as to have matching page granularity between the first operating system 1212 and the second operating system 1224 (as indicated by the dashed box 1226).

In some embodiments, a guest linker and a host linker may communicate to cooperatively locate identical instructions and locate the identical instructions in page granularity (e.g., starting from a page boundary and ending at a page boundary). These identical instructions may form natural sections, and may be linked with other corresponding instructions located at arbitrary positions.

Figure 14:
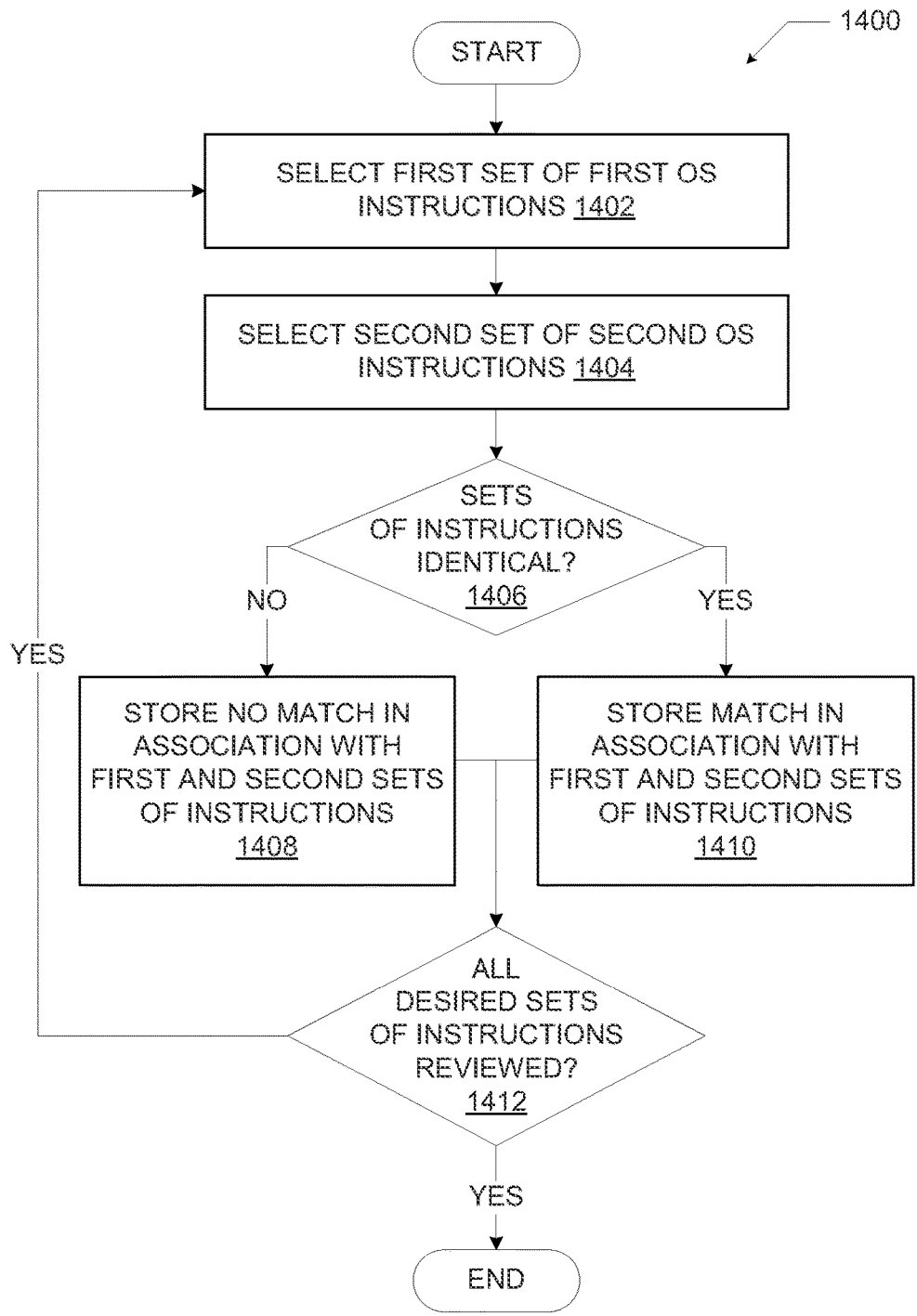
FIG. 14 is a flow diagram of a process for comparing instruction sets of different operating systems, in accordance with various embodiments.
Figure 15:
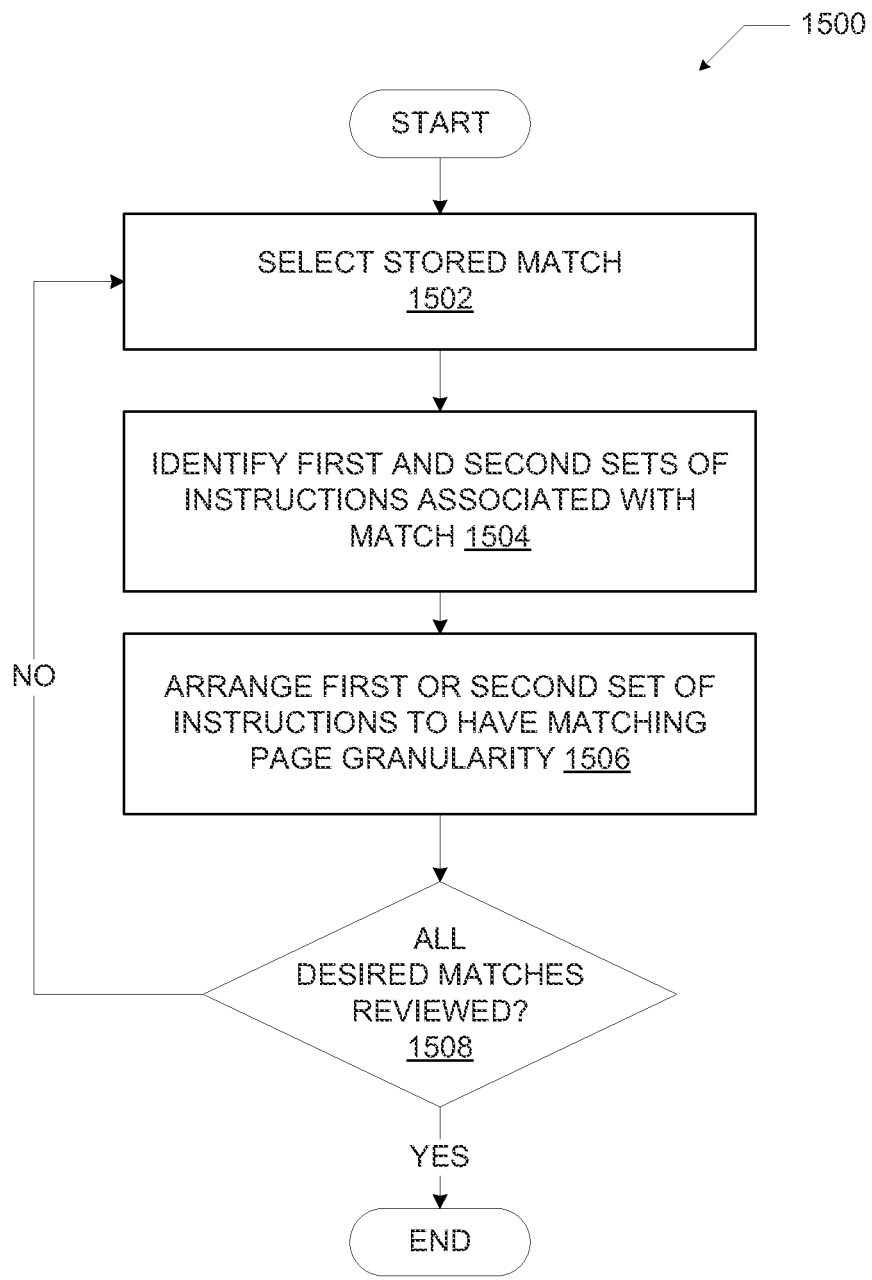
FIG. 15 is a flow diagram of a process for arranging instruction sets of an operating system, in accordance with various embodiments.

FIGS. 14-15 are flow diagrams of processes for memory organization in a virtual computing environment, in accordance with various embodiments. For ease of illustration, the processes of FIGS. 14-15 may be described as performed by the memory organization logic 308 in the virtual computing environment 300, but any suitable hardware may be configured to execute these processes.

FIG. 14 is a flow diagram of a process 1400 for comparing instruction sets of different operating systems, in accordance with various embodiments. In various embodiments, the first and second operating systems discussed with reference to the process 1400 may correspond to an operating system of a guest machine and an operating system of a candidate host machine. Operations of the process 1400 may be discussed as performed by the instruction comparison logic 1002, but as noted above, any suitable hardware may be configured to execute the process 1400.

The process 1400 may begin at 1402, at which the instruction comparison logic 1002 may select a first set of instructions for a first operating system. The first set of instructions selected at 1402 may be selected based on a schedule and/or sequentially in a predetermined range or set of instructions that are to be compared between the first operating system and a second operating system (discussed below with reference to 1404). In some embodiments, the first set of instructions may be a set of instructions delineated by comments or other code separators that provide logical boundaries for the comparisons of the process 1400. Any suitable technique for selecting sets of instructions may be used. In some embodiments, the instruction comparison logic 1002 may use information about the first operating system and the second operating system to aid the selection of 1402. For example, the instruction comparison logic 1002 may compare the versions of the first and second operating systems to determine whether the operating systems are identical or related (and thus likely to have particular identical instructions), as discussed above.

At 1404, the instruction comparison logic 1002 may select a second set of instructions for a second operating system. The second set of instructions selected at 1404 may be selected based on a schedule and/or sequentially in a predetermined range or set of instructions that are to be compared between the first operating system (1402) and the second operating system. In some embodiments, the second set of instructions may be a set of instructions delineated by comments or other code separators that provide logical boundaries for the comparisons of the process 1400, but any suitable technique for selecting sets of instructions may be used. In some embodiments, the instruction comparison logic 1002 may use information about the first operating system and the second operating system to aid the selection of 1404, as discussed above with reference to 1402.

At 1406, the instruction comparison logic 1002 may determine whether the first set of instructions (selected at 1402) and the second set of instructions (selected at 1404) are identical. In some embodiments, this determination may include a character-by-character or bit-by-bit comparison of the sets of instructions, or may include a comparison of hashes of the sets of instructions, as discussed above with reference to memory pages. Any suitable comparison technique may be used. If the instruction comparison logic 1002 determines at 1406 that the sets of instructions are not identical, the instruction comparison logic 1002 may proceed to 1408 and store a "no match" identifier in a memory in association with the first set of instructions and the second set of instructions (e.g., in the storage device 320). This "no match" identifier may take any suitable form (e.g., a binary indicator of "0") and may be stored in any suitable data structure (e.g., a table in which sets of instructions of the first operating system correspond to rows and sets of instructions of the second operating system correspond to columns) so that the result that the first set of instructions and the second set of instructions were not identical can be readily determined. In some embodiments, no data may be stored as a result of the determination that the first and second sets of instructions are not identical, and thus the operations of 1406 may not be performed.

If the instruction comparison logic 1002 determines at 1406 that the first and second instruction sets are identical, the instruction comparison logic 1002 may proceed to 1410 and may store a "match" identifier in a memory in association with the first instruction set and the second instruction set (e.g., in the storage device 320). This "match" identifier may take any suitable form (e.g., a binary indicator of "1") and may be stored in any suitable data structure (e.g., a table in which sets of instructions of the first operating system correspond to rows and sets of instructions of the second operating system correspond to columns) so that the result that the first and second sets of instructions are identical can be readily determined. In some embodiments, the match identifier may be stored at 1408 by recording the memory locations of identical sets of instructions in a data structure in the storage device 320 (e.g., for later access by the arrangement logic 1004).

At 1412, the instruction comparison logic 1002 may determine whether all desired set of instructions (e.g., all desired pairs of sets of instructions) have been reviewed for identicality. This determination may include determining whether the end of a predetermined range or set of sets of instructions has been reached, and all sets of instructions in that predetermined range or set have been reviewed. If the instruction comparison logic 1002 determines at 1412 that there are still sets of instructions to be reviewed, the instruction comparison logic 1002 may return to 1402 and select additional sets of instructions for review. If the instruction comparison logic 1002 determines at 1412 that all desired sets of instructions have been reviewed, the process 1400 may then end. As noted above, the process 1400 may be repeated for various sets of instructions in accordance with any desired schedule.

FIG. 15 is a flow diagram of a process 1500 for arranging instruction sets of an operating system, in accordance with various embodiments. In various embodiments, the first and second operating systems (and corresponding first and second sets of instructions) discussed with reference to the process 1500 may correspond to an operating system of a guest machine and an operating system of a candidate host machine. Operations of the process 1500 may be discussed as performed by the arrangement logic 1004, but as noted above, any suitable hardware may be configured to execute the process 1500.

The process 1500 may begin at 1502, at which the arrangement logic 1004 may select a stored "match" identifier between a first set of instructions from a first operating system and a second set of instructions from a second operating system. As discussed above with reference to 1408 and 1410 of FIG. 14, data indicative of whether or not the first and second sets of instructions were determined to be identical may be stored in a memory (e.g., in the storage device 320) in any suitable data structure (e.g., a table including "match" and "no match" identifiers). Thus, at 1502, the arrangement logic 1004 may access this data structure to select a "match" identifier (if one exists). The arrangement logic 1004 may use any suitable technique or follow any suitable pattern to review and select a stored "match" identifier (e.g., element-by-element review).

At 1504, the arrangement logic 1004 may identify the sets of instructions associated with the "match" identifier selected at 1502. In some embodiments, the data structure used to store the "match" and "no match" identifiers (e.g., as discussed above with reference to 1408 and 1410 of FIG. 14) may include links or pointers to the first and second sets of instructions associated with the "match" and "no match" identifiers so that the associated first and second sets of instructions may be readily identified. In other embodiments, a look-up table or other data structure may be used to determine which first and second sets of instructions are associated with a particular "match" or "no match" identifier. In some embodiments, the arrangement logic 1004 may identify the first and second sets of instructions at 1504 by identifying physical memory addresses for each of the first and second sets of instructions.

At 1506, the arrangement logic 1004 may arrange the first set of instructions and/or the second set of instructions to have matching page granularity. As discussed above, the arrangement logic 1004 may be included in a linker for the first set of instructions or a linker for the second set of instructions; in such embodiments, the arrangement logic 1004 may arrange the associated set of instructions and may coordinate with logic included in the counterpart linker (e.g., arrangement logic configured as described for the arrangement logic 1004) to arrange the other sets of instructions to achieve matching page granularity.

At 1508, the arrangement logic 1004 may determine whether all desired matches (e.g., all desired pairs of sets of instructions associated with "match" identifiers) have been reviewed. This determination may include determining whether the end of a data structure including the "match" identifiers has been reached, and all matches in that data structure have been reviewed. If the arrangement logic 1004 determines at 1508 that there are still matches to be reviewed, the arrangement logic 1004 may return to 1502 and select another "match" identifier for review. If the arrangement logic 1004 determines at 1508 that all desired matches have been reviewed, the process 1500 may then end. As noted above, the process 1500 may be repeated for various matches in accordance with any desired schedule. The schedule on which the process 1500 is performed may be related to or may be independent from the schedule on which the process 1400 is performed.

As noted above, content-based page sharing mechanisms between different guest machines in a virtual computing environment have previously been used to reduce memory usage, but the challenge of shared caches between guest machines and host machines has not been previously recognized or addressed. Instead, conventional approaches have treated guest machine and host machine cache sharing as relatively minor, since the footprint of the shared cache (e.g., the footprint of a VMM) may be relatively small, and thus no techniques have effectively mitigated the cache pollution incurred by guest exit handling. The systems and techniques disclosed herein may provide performance improvements in addition to those achievable by other memory management techniques (such as cache line alignment, identifying read-most data together, and cache prefetching), particularly when the available cache size is small.

Figure 16:
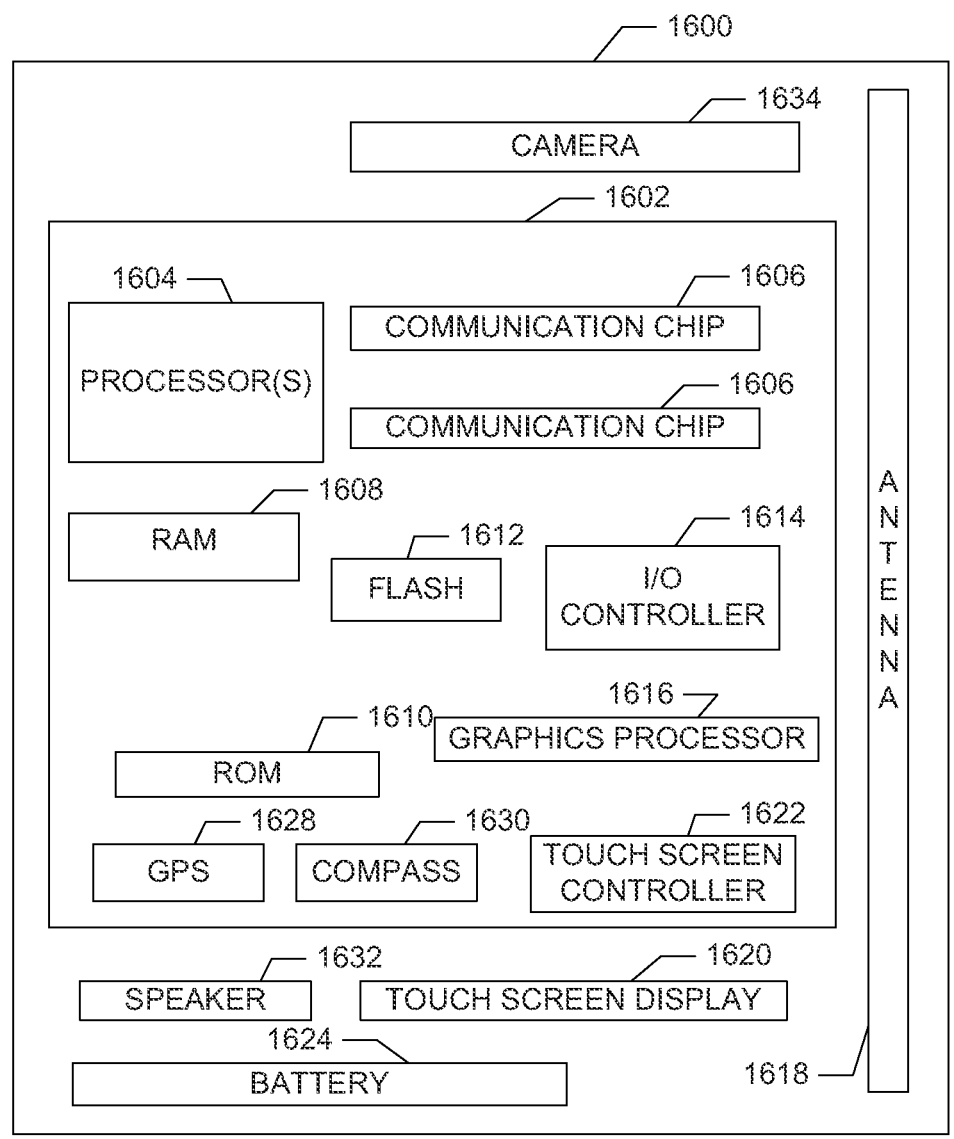
FIG. 16 is a block diagram of an example computing device that may be used to practice various embodiments described herein.

FIG. 16 is a block diagram of an example computing device 1600, which may be suitable for practicing various disclosed embodiments. For example, the computing device 1600 may serve as the host machine 102, the resource manager 304, the host machine 318, the host machine 302, the client machine 310, and/or the client machine 314. In some embodiments, the components of the computing device 1600 may be distributed across multiple physical device housings or locations, while in other embodiments, the components of the computing device 1600 may be included in a single housing or location.

The computing device 1600 may include a number of components, including one or more processor(s) 1604 and at least one communication chip 1606. In various embodiments, the processor 1604 may include a processor core. In various embodiments, at least one communication chip 1606 may also be physically and electrically coupled to the processor 1604. In further implementations, the communication chip 1606 may be part of the processor 1604. In various embodiments, the computing device 1600 may include a printed circuit board (PCB) 1602. For these embodiments, the processor 1604 and the communication chip 1606 may be disposed thereon. In alternate embodiments, the various components may be coupled without the employment of the PCB 1602.

Depending on its applications (e.g., memory and resource management applications), the computing device 1600 may include other components that may or may not be physically and electrically coupled to the PCB 1602. These other components include, but are not limited to, random access memory (RAM) 1608, volatile memory (such as dynamic RAM (DRAM)), non-volatile memory (e.g., read-only memory 1610, also referred to as "ROM," one or more hard disk drives, one or more solid-state drives, one or more compact disc drives, and/or one or more digital versatile disc drives), flash memory 1612, input/output (I/O) controller 1614, a digital signal processor (not shown), a crypto processor (not shown), graphics processor 1616, one or more antenna 1618, touch screen display 1620, touch screen controller 1622, other displays (such as liquid-crystal displays, cathode-ray tube displays, and e-ink displays, not shown), battery 1624, an audio codec (not shown), a video codec (not shown), global positioning system (GPS) device 1628, compass 1630, an accelerometer (not shown), a gyroscope (not shown), speaker 1632, camera 1634, and a mass storage device (such as hard disk drive, a solid state drive, compact disk (CD), digital versatile disk (DVD)) (not shown), any other desired sensors (not shown) and so forth. In various embodiments, the processor 1604 may be integrated on the same die with other components to form a System on Chip (SoC). Any of the storage devices discussed herein (e.g., the storage device 106 and the storage device 320) may include any one or more of the memory devices illustrated in FIG. 16 or discussed herein with reference to FIG. 16.

In various embodiments, volatile memory (e.g., RAM 1608), non-volatile memory (e.g., ROM 1610), flash memory 1612, and the mass storage device may include instructions that, in response to execution by the one or more processor(s) 1604, cause the computing device 1600 to practice all or selected aspects of the processes described herein. For example, one or more of the memory components, such as volatile memory (e.g., RAM 1608), non-volatile memory (e.g., ROM 1610), flash memory 1612, and the mass storage device, may be machine readable media that include temporal and/or persistent (e.g., non-transitory) copies of instructions that, in response to execution by the one or more processor(s) 1604, cause the computing device 1600 to practice all or selected aspects of the processes described herein. Memory accessible to the computing device 1600 may include one or more storage devices that are physically part of a device on which the computing device 1600 is installed and/or one or more storage devices that are accessible by, but not necessarily a part of, the computing device 1600. For example, a storage device may be accessed by the computing device 1600 over a network via the communication chip 1606.

The communication chip 1606 may enable wired and/or wireless communications for the transfer of data to and from the computing device 1600. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems, as noted above. However, communication chips 1606 may implement any of a number of wireless standards or protocols, including but not limited to IEEE02.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 1600 may include a plurality of communication chips 1606. For instance, a first communication chip 1606 may be dedicated to shorter range wireless communications such as Wi-Fi and Bluetooth and a second communication chip 1606 may be dedicated to longer range wireless communications such as GPS, EDGE, GPRS, CDMA, WiMAX, LTE, Ev-DO, and others.

In various implementations, the computing device 1600 may be a laptop, a netbook, a notebook, an ultrabook, a smartphone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 1600 may be any other electronic device that processes data.

The following paragraphs describe examples of various embodiments.

Example 1 is an apparatus for memory management in a virtual computing environment, comprising: a storage device; memory page comparison logic, coupled to the storage device, to determine that a first memory page of instructions, stored in the storage device, for a guest machine in the virtual computing environment is identical to a second memory page of instructions, stored in the storage device, for a host machine in the virtual computing environment, wherein the guest machine is hosted by the host machine; and merge logic, coupled to the memory page comparison logic, to, in response to a determination that the first memory page is identical to the second memory page, map the first memory page to the second memory page.

Example 2 may include the subject matter of Example 1, and may further specify that the first memory page and the second memory page comprise interrupt service routine instructions.

Example 3 may include the subject matter of any of Examples 1-2, and may further specify that determine that the first memory page is identical to the second memory page comprises determine that a hash of the first memory page is identical to a hash of the second memory page.

Example 4 may include the subject matter of any of Examples 1-3, and may further specify that the merge logic is further to mark the first memory page as read-only.

Example 5 may include the subject matter of any of Examples 1-4, and may further specify that map the first memory page to the second memory page comprises map the first memory page to the second memory page in a page table.

Example 6 may include the subject matter of any of Examples 1-5, and may further specify that the memory page comparison logic is to determine that the first memory page is identical to the second memory page in response to a loading of the guest machine.

Example 7 may include the subject matter of any of Examples 1-6, and may further specify that the memory page comparison logic is to determine that the first memory page is identical to the second memory page as part of a periodic scan of the first memory page and the second memory page.

Example 8 is an apparatus for resource allocation in a virtual computing environment, comprising: a storage device; memory page comparison logic to determine that at least a first memory page of instructions, stored in the storage device, for a guest machine in the virtual computing environment is identical to at least a second memory page of instructions, stored in the storage device, for a host machine in the virtual computing environment, wherein the guest machine is unassigned to a host or assigned to a host different from the host machine; and assignment logic, coupled to the memory page comparison logic, to, in response to a determination that the first memory page is identical to the second memory page, assign the guest machine for execution on the host machine.

Example 9 may include the subject matter of Example 8, and may further specify that determine that at least the first memory page of instructions for the guest machine is identical to at least the second memory page of instructions for the host machine comprises determine that a plurality of memory pages of instructions, stored in the storage device, for the guest machine, are identical to a corresponding plurality of memory pages of instructions for the host machine.

Example 10 may include the subject matter of any of Examples 8-9, and may further specify that the first memory page of instructions and the second memory page of instructions are kernel instructions.

Example 11 may include the subject matter of any of Examples 8-10, and may further specify that assign the guest machine for execution on the host machine includes to live migrate the guest machine to the host machine.

Example 12 may include the subject matter of any of Examples 8-11, and may further specify that determine that at least the first memory page of instructions for the guest machine is identical to at least the second memory page of instructions for the host machine includes to compare an operating system version of the guest machine to an operating system version of the host machine.

Example 13 is an apparatus for memory organization in a virtual computing environment, comprising: a storage device; instruction comparison logic, coupled to the storage device, to determine that a first set of operating system instructions, stored in the storage device, for a guest machine in the virtual computing environment is identical to a second set of operating system instructions, stored in the storage device, for a host machine in the virtual computing environment, wherein the guest machine is not assigned for execution on the host machine; and arrangement logic, coupled to the instruction comparison logic, to, in response to a determination that the first set of operating system instructions is identical to the second set of operating system instructions, arrange a set of operating system instructions, the set of operating system instructions selected from the group consisting of the first set of operating system instructions and the second set of operating system instructions, so that the set of operating system instructions is included in one or more memory pages in the storage device, begins at a page boundary of the one or more memory pages, and ends at a page boundary of the one or more memory pages.

Example 14 may include the subject matter of Example 13, and may further include: memory page comparison logic to determine that at least a first memory page of instructions, stored in the storage device, for the guest machine is identical to at least a second memory page of instructions, stored in the storage device, for the host machine, wherein the guest machine is unassigned to a host or assigned to a host different from the host machine; and assignment logic, coupled to the memory page comparison logic, to, in response to a determination that the first memory page is identical to the second memory page, assign the guest machine for execution on the host machine.

Example 15 may include the subject matter of any of Examples 13-14, and may further specify that the set of operating system instructions include the first set of operating system instructions and the arrangement logic is included in a linker for the guest machine.

Example 16 may include the subject matter of Example 15, and may further specify that the instruction comparison logic is to communicate with a linker for the host machine to determine that the first set of operating system instructions is identical to the second set of operating system instructions.

Example 17 may include the subject matter of any of Examples 13-16, and may further specify that the set of operating system instructions include the second set of operating system instructions and the arrangement logic is included in a linker for the host machine.

Example 18 may include the subject matter of Example 17, and may further specify that the instruction comparison logic is to communicate with a linker for the guest machine to determine that the first set of operating system instructions is identical to the second set of operating system instructions.

Example 19 is a method for memory management in a virtual computing environment, comprising: determining that a first memory page of instructions, stored in a storage device, for a guest machine in the virtual computing environment is identical to a second memory page of instructions, stored in the storage device, for a host machine in the virtual computing environment, wherein the guest machine is hosted by the host machine; in response to a determination that the first memory page is identical to the second memory page, mapping the first memory page to the second memory page.

Example 20 may include the subject matter of Example 19, and may further specify that the first memory page and the second memory page comprise interrupt service routine instructions.

Example 21 may include the subject matter of any of Examples 19-20, and may further specify that determining that the first memory page is identical to the second memory page comprises determining that a hash of the first memory page is identical to a hash of the second memory page.

Example 22 may include the subject matter of any of Examples 19-21, and may further include marking the first memory page as read-only.

Example 23 may include the subject matter of any of Examples 19-22, and may further specify that mapping the first memory page to the second memory page comprises mapping the first memory page to the second memory page in a page table.

Example 24 may include the subject matter of any of Examples 19-23, and may further specify that determining that the first memory page is identical to the second memory page is performed in response to a loading of the guest machine.

Example 25 may include the subject matter of any of Examples 19-24, and may further specify that determining that the first memory page is identical to the second memory page is performed as part of a periodic scan of the first memory page and the second memory page.

Example 26 is a method for resource allocation in a virtual computing environment, comprising: determining that at least a first memory page of instructions, stored in a storage device, for a guest machine in the virtual computing environment is identical to at least a second memory page of instructions, stored in the storage device, for a host machine in the virtual computing environment, wherein the guest machine is unassigned to a host or assigned to a host different from the host machine; and in response to a determination that the first memory page is identical to the second memory page, assigning the guest machine for execution on the host machine.

Example 27 may include the subject matter of Example 26, and may further specify that determining that at least the first memory page of instructions for the guest machine is identical to at least the second memory page of instructions for the host machine comprises determining that a plurality of memory pages of instructions, stored in the storage device, for the guest machine, are identical to a corresponding plurality of memory pages of instructions for the host machine.

Example 28 may include the subject matter of any of Examples 26-27, and may further specify that the first memory page of instructions and the second memory page of instructions are kernel instructions.

Example 29 may include the subject matter of any of Examples 26-28, and may further specify that assigning the guest machine for execution on the host machine comprises live migrating the guest machine to the host machine.

Example 30 may include the subject matter of any of Examples 26-29, and may further specify that determining that at least the first memory page of instructions for the guest machine is identical to at least the second memory page of instructions for the host machine comprises comparing an operating system version of the guest machine to an operating system version of the host machine.

Example 31 is a method for memory organization in a virtual computing environment, comprising: determining that a first set of operating system instructions, stored in a storage device, for a guest machine in the virtual computing environment is identical to a second set of operating system instructions, stored in the storage device, for a host machine in the virtual computing environment, wherein the guest machine is not assigned for execution on the host machine; and in response to a determination that the first set of operating system instructions is identical to the second set of operating system instructions, arranging a set of operating system instructions, the set of operating system instructions selected from the group consisting of the first set of operating system instructions and the second set of operating system instructions, so that the set of operating system instructions is included in one or more memory pages in the storage device, begins at a page boundary of the one or more memory pages, and ends at a page boundary of the one or more memory pages.

Example 32 may include the subject matter of Example 31, and may further include: determining that at least a first memory page of instructions, stored in the storage device, for the guest machine is identical to at least a second memory page of instructions, stored in the storage device, for the host machine, wherein the guest machine is unassigned to a host or assigned to a host different from the host machine; and in response to a determination that the first memory page is identical to the second memory page, assigning the guest machine for execution on the host machine.

Example 33 may include the subject matter of any of Examples 31-32, and may further specify that the set of operating system instructions includes the first set of operating system instructions and the arranging the set of operating system instructions is performed by a linker for the guest machine.

Example 34 may include the subject matter of Example 33, and may further include communicating with a linker for the host machine to determine that the first set of operating system instructions is identical to the second set of operating system instructions.

Example 35 may include the subject matter of any of Examples 31-34, and may further specify that the set of operating system instructions includes the second set of operating system instructions and the arranging the set of operating system instructions is performed by a linker for the host machine.

Example 36 may include the subject matter of Example 35, and may further include communicating with a linker for the guest machine to determine that the first set of operating system instructions is identical to the second set of operating system instructions.

Example 37 is one or more computer readable media having instructions thereon that, in response to execution by one or more processing devices of a computing device, cause the computing device to perform the method of any of claims 19-36.

Example 38 is an apparatus for memory management in a virtual computing environment, comprising: means for determining that a first memory page of instructions, stored in a storage device, for a guest machine in the virtual computing environment is identical to a second memory page of instructions, stored in the storage device, for a host machine in the virtual computing environment, wherein the guest machine is hosted by the host machine; means for, in response to a determination that the first memory page is identical to the second memory page, mapping the first memory page to the second memory page.

Example 39 may include the subject matter of Example 38, and may further specify that the first memory page and the second memory page comprise interrupt service routine instructions.

Example 40 may include the subject matter of any of Examples 38-38, and may further specify that the means for determining that the first memory page is identical to the second memory page comprises means for determining that a hash of the first memory page is identical to a hash of the second memory page.

Example 41 may include the subject matter of any of Examples 38-40, and may further include means for marking the first memory page as read-only.

Example 42 may include the subject matter of any of Examples 38-41, and may further specify that the means for mapping the first memory page to the second memory page comprises means for mapping the first memory page to the second memory page in a page table.

Example 43 may include the subject matter of any of Examples 38-42, and may further specify that the means for determining that the first memory page is identical to the second memory page performs the determination in response to a loading of the guest machine.

Example 44 may include the subject matter of any of Examples 38-43, and may further specify that the means for determining that the first memory page is identical to the second memory page performs the determination as part of a periodic scan of the first memory page and the second memory page.

Example 45 is an apparatus for resource allocation in a virtual computing environment, comprising: means for determining that at least a first memory page of instructions, stored in a storage device, for a guest machine in the virtual computing environment is identical to at least a second memory page of instructions, stored in the storage device, for a host machine in the virtual computing environment, wherein the guest machine is unassigned to a host or assigned to a host different from the host machine; and means for, in response to a determination that the first memory page is identical to the second memory page, assigning the guest machine for execution on the host machine.

Example 46 may include the subject matter of Example 45, and may further specify that the means for determining that at least the first memory page of instructions for the guest machine is identical to at least the second memory page of instructions for the host machine comprises means for determining that a plurality of memory pages of instructions, stored in the storage device, for the guest machine, are identical to a corresponding plurality of memory pages of instructions for the host machine.

Example 47 may include the subject matter of any of Examples 45-46, and may further specify that the first memory page of instructions and the second memory page of instructions are kernel instructions.

Example 48 may include the subject matter of any of Examples 45-47, and may further specify that the means for assigning the guest machine for execution on the host machine comprises means for live migrating the guest machine to the host machine.

Example 49 may include the subject matter of any of Examples 45-48, and may further specify that the means for determining that at least the first memory page of instructions for the guest machine is identical to at least the second memory page of instructions for the host machine comprises means for comparing an operating system version of the guest machine to an operating system version of the host machine.

Example 50 is an apparatus for memory organization in a virtual computing environment, comprising: means for determining that a first set of operating system instructions, stored in a storage device, for a guest machine in the virtual computing environment is identical to a second set of operating system instructions, stored in the storage device, for a host machine in the virtual computing environment, wherein the guest machine is not assigned for execution on the host machine; and means for, in response to a determination that the first set of operating system instructions is identical to the second set of operating system instructions, arranging a set of operating system instructions, the set of operating system instructions selected from the group consisting of the first set of operating system instructions and the second set of operating system instructions, so that the set of operating system instructions is included in one or more memory pages in the storage device, begins at a page boundary of the one or more memory pages, and ends at a page boundary of the one or more memory pages.

Example 51 may include the subject matter of Example 50, and may further include: means for determining that at least a first memory page of instructions, stored in the storage device, for the guest machine is identical to at least a second memory page of instructions, stored in the storage device, for the host machine, wherein the guest machine is unassigned to a host or assigned to a host different from the host machine; and means for, in response to a determination that the first memory page is identical to the second memory page, assigning the guest machine for execution on the host machine.

Example 52 may include the subject matter of any of Examples 50-51, and may further specify that the set of operating system instructions includes the first set of operating system instructions and the means for arranging the set of operating system instructions is a linker for the guest machine.

Example 53 may include the subject matter of Example 52, and may further include means for communicating with a linker for the host machine to determine that the first set of operating system instructions is identical to the second set of operating system instructions.

Example 54 may include the subject matter of any of Examples 50-53, and may further specify that the set of operating system instructions includes the second set of operating system instructions and the means for arranging the set of operating system instructions is a linker for the host machine.

Example 55 may include the subject matter of Example 54, and may further include means for communicating with a linker for the guest machine to determine that the first set of operating system instructions is identical to the second set of operating system instructions.

What is claimed is:

1. An apparatus for memory management in a virtual computing environment, comprising:
    a storage device including first memory area for a host machine, second memory area for a guest machine hosted by the host machine, a cache memory to selectively cache content of the first and second memory areas;
    a hardware processor;
    memory page comparison logic executed by the hardware processor coupled to the storage device to determine that a first memory page of instructions, stored in the second memory area of the storage device, for the guest machine in the virtual computing environment is identical to a second memory page of instructions, stored in the first memory area of the storage device, for a host machine in the virtual computing environment; and
    merge logic executed by the hardware processor to, in response to a determination that the first memory page of instructions is identical to the second memory page of instructions, map the first memory page of instructions to the second memory page of instructions to cause a copy of the second memory page of instructions cached in the cache memory also serves as a cache copy of the first memory page of instructions.

2. The apparatus of claim 1, wherein the first memory page of instructions and the second memory page of instructions comprise interrupt service routine instructions.

3. The apparatus of claim 1, wherein to determine that the first memory page of instructions is identical to the second memory page of instructions comprises determine that a hash of the first memory page of instructions is identical to a hash of the second memory page of instructions.

4. The apparatus of claim 1, wherein the merge logic is further to mark the first memory page of instructions as read-only.

5. The apparatus of claim 1, wherein to map the first memory page of instructions to the second memory page of instructions comprises to map the first memory page of instructions to the second memory page of instructions in a page table.

6. The apparatus of claim 1, wherein the memory page comparison logic is to determine that the first memory page of instructions is identical to the second memory page of instructions in response to a loading of the guest machine.

7. The apparatus of claim 1, wherein the memory page comparison logic is to determine that the first memory page of instructions is identical to the second memory page of instructions as part of a periodic scan of the first memory page and the second memory page.

8. One or more non-transitory computer readable media having instructions thereon that, in response to execution by one or more hardware processors of a computing device, cause the computing device to:
    determine that a first memory page of instructions, stored in a storage device of the computing device, for a guest machine in a virtual computing environment is identical to a second memory page of instructions, stored in the storage device, for a host machine in the virtual computing environment, wherein the guest machine is hosted by the host machine; and in response to a determination that the first memory page of instructions is identical to the second memory page, map the first memory page to the second memory page of instructions to cause a copy of the second memory page of instructions cached in the cache memory also serves as a cache copy of the first memory page of instructions.

9. The one or more non-transitory computer readable media of claim 8, wherein the first memory page of instructions and the second memory page of instructions comprise interrupt service routine instructions.

10. The one or more non-transitory computer readable media of claim 8, wherein determine that the first memory page of instructions is identical to the second memory page of instructions comprises determine that a hash of the first memory page of instructions is identical to a hash of the second memory page of instructions.

11. The one or more non-transitory computer readable media of claim 8, further having instructions thereon that, in response to execution by the one or more processors of the computing device, cause the computing device to:
    mark the first memory page as read-only.

12. The one or more non-transitory computer readable media of claim 8, wherein map the first memory page of instructions to the second memory page of instructions comprises map the first memory page of instructions to the second memory page of instructions in a page table.

13. The one or more non-transitory computer readable media of claim 8, wherein determine that the first memory page of instructions is identical to the second memory page of instructions is performed in response to a loading of the guest machine.

14. The one or more non-transitory computer readable media of claim 8, wherein determine that the first memory page of instructions is identical to the second memory page of instructions is performed as part of a periodic scan of the first memory page of instructions and the second memory page of instructions.

15. One or more non-transitory computer readable media having instructions thereon that, in response to execution by one or more hardware processors of a computing device, cause the computing device to:
    determine that a first set of operating system instructions, stored in a storage device, for a guest machine in a virtual computing environment is identical to a second set of operating system instructions, stored in the storage device, for a host machine in the virtual computing environment, wherein the guest machine is not assigned for execution on the host machine; and in response to a determination that the first set of operating system instructions is identical to the second set of operating system instructions, arrange a set of operating system instructions, the set of operating system instructions selected from a group consisting of the first set of operating system instructions and the second set of operating system instructions, so that the set of operating system instructions is included in one or more memory pages in the storage device, begins at a page boundary of the one or more memory pages, and ends at a page boundary of the one or more memory pages; and
    in response to arranging the set of operating system instructions so that the set of operating system instructions is included in one or more memory pages in the storage device, begins at a page boundary of the one or more memory pages, and ends at a page boundary of the one or more memory pages, assign the guest machine for execution on the host machine, with the guest machine and the host machine sharing the set of operating system instructions included in the one or more memory pages in the storage device, and arranged to begin at a page boundary of the one or more memory pages, and end at a page boundary of the one or more memory pages, to cause a copy of the shared set of operating system instructions cached in a cache memory of the computing device to be shared by the guest machine and host machine.

16. The one or more non-transitory computer readable media of claim 15, wherein the set of operating system instructions is the first set of operating system instructions and arrange the set of operating system instructions is performed by a linker for the guest machine.

17. The one or more non-transitory computer readable media of claim 16, further having instructions thereon that, in response to execution by the one or more hardware processors of the computing device, cause the computing device to:
    communicate with a linker for the host machine to determine that the first set of operating system instructions is identical to the second set of operating system instructions.

18. The one or more non-transitory computer readable media of claim 15, wherein the set of operating system instructions is the second set of operating system instructions and arrange the set of operating system instructions is performed by a linker for the host machine.

19. The one or more non-transitory computer readable media of claim 18, further having instructions thereon that, in response to execution by the one or more hardware processors of the computing device, cause the computing device to:
    communicate with a linker for the guest machine to determine that the first set of operating system instructions is identical to the second set of operating system instructions.

* * * * *